United States Patent
Yamine

(10) Patent No.: US 11,363,661 B2
(45) Date of Patent: Jun. 14, 2022

(54) METHODS AND ARRANGEMENTS FOR ASSISTING RECOVERY OF CALL SETUP FAILURE IN A WIRELESS COMMUNICATION SYSTEM

(71) Applicant: Telefonaktiebolaget LM Ericsson (publ), Stockholm (SE)

(72) Inventor: Badawi Yamine, Beirut (LB)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 35 days.

(21) Appl. No.: 16/975,119

(22) PCT Filed: Mar. 21, 2018

(86) PCT No.: PCT/EP2018/057161
§ 371 (c)(1),
(2) Date: Aug. 22, 2020

(87) PCT Pub. No.: WO2019/179615
PCT Pub. Date: Sep. 26, 2019

(65) Prior Publication Data
US 2020/0404728 A1 Dec. 24, 2020

(51) Int. Cl.
*H04W 76/18* (2018.01)
*H04W 76/11* (2018.01)
(Continued)

(52) U.S. Cl.
CPC ..... *H04W 76/18* (2018.02); *H04W 36/00835* (2018.08); *H04W 36/305* (2018.08);
(Continued)

(58) Field of Classification Search
CPC ..... H04W 76/18; H04W 76/19; H04W 76/00; H04W 76/10; H04W 36/305;
(Continued)

(56) References Cited

U.S. PATENT DOCUMENTS

2001/0043561 A1* 11/2001 Burns et al. ............... 370/216
2005/0147052 A1* 7/2005 Wu ............................ 370/252
(Continued)

FOREIGN PATENT DOCUMENTS

WO 2013149652 A1 10/2013
WO 2017070213 A1 4/2017

OTHER PUBLICATIONS

PCT International Search Report, dated Dec. 21, 2018, in connection with International Application No. PCT/EP2018/057161, all pages.
(Continued)

*Primary Examiner* — Meless N Zewdu
(74) *Attorney, Agent, or Firm* — Leffler Intellectual Property Law, PLLC

(57) ABSTRACT

The present disclosure relates to arrangements and methods performed in a wireless network comprising an operation support system (OSS) and a plurality of radio base stations, (RBSs), each RBS providing one or more cells. When performed in a wireless device, the method comprises registering of a set number of consecutive call setup failures to an RBS providing a first cell. The method further comprises initiating a cell reselection procedure to a RBS providing a default cell, and providing, at call setup in the default cell, a call setup failure report to the RBS providing the default cell, wherein the call set up failure report comprises information on the call setup failures to the RBS providing the first cell. Additionally the method comprises causing forwarding of the call setup failure report from the RBS providing the default cell to the OSS, wherein the forwarding of the call setup failure report is caused in compliance with a latency constraint for call setup recovery.

32 Claims, 10 Drawing Sheets

(51) Int. Cl.
*H04W 36/30* (2009.01)
*H04W 36/00* (2009.01)
*H04W 48/16* (2009.01)
*H04W 60/00* (2009.01)
*H04W 64/00* (2009.01)

(52) U.S. Cl.
CPC ........... *H04W 48/16* (2013.01); *H04W 60/00* (2013.01); *H04W 64/00* (2013.01); *H04W 76/11* (2018.02)

(58) Field of Classification Search
CPC ..... H04W 24/10; H04W 36/30; H04W 36/00; H04W 76/11; H04W 60/00; H04W 48/16; H04W 64/00; H04W 36/00835; H04W 48/20; H04W 24/04; H04W 4/16; H04W 36/0079; H04W 36/24; H04W 88/00; H04W 88/02; H04W 88/08; H04W 36/02; H04W 36/023; H04W 36/22; H04W 48/06; H04W 28/0242; H04W 28/08; H04W 28/0284; H04W 36/16; H04W 36/20; H04W 76/20; H04W 28/0289; H04W 48/04; H04W 36/34; H04W 36/36; H04W 16/28; H04W 8/183; H04W 8/20; H04W 8/24; H04W 4/029
See application file for complete search history.

(56) References Cited

U.S. PATENT DOCUMENTS

2009/0247137 A1* 10/2009 Awad ........................ 455/418
2013/0242898 A1* 9/2013 Johansson et al. ... H04W 24/10
2014/0043998 A1* 2/2014 Wang et al. .......... H04W 24/10
2014/0135011 A1* 5/2014 Altalef et al. ........ H04W 36/20
2016/0157114 A1 6/2016 Kalderen et al.
2017/0201911 A1* 7/2017 Ng et al. ........... H04W 36/0022

OTHER PUBLICATIONS

PCT Written Opinion, dated Dec. 21, 2018, in connection with International Application No. PCT/EP2018/057161, all pages.

* cited by examiner

METHODS AND ARRANGEMENTS FOR ASSISTING RECOVERY OF CALL SETUP FAILURE IN A WIRELESS COMMUNICATION SYSTEM

TECHNICAL FIELD

The present disclosure relates to methods and arrangements for assisting call setup recovery in a wireless network.

BACKGROUND

Wireless communication networks are widely deployed to provide various communication services such as telephony, video, data, messaging, broadcasts, and so on. Universal Mobile Telecommunication System (UMTS), Long Term Evolution (LTE), and 5G, are examples of technologies for realizing high-speed packet-based communication in a wireless network. In such wireless networks, a wireless device, e.g., User Equipment (UE) is wirelessly connected to a radio access node, also generally known as a radio base station (RBS). Network management functions of the wireless network are provided through an operations support system (OSS).

An idle mode UE, attempting to set up a call to a RBS providing a cell in the wireless network, follows a call set up procedure wherein cell priority and received radio conditions at UE side, e.g., Reference Signal Received Power (RSRP) and Reference Signal Received Quality (RSRQ), are considered in the cell selection procedure. The same applies to cell re-selection, where a call set up failure in an initial cell brings about a cell reselection attempt based on RSRP and RSRQ measurements.

In any wireless network, it might happen that at some geographical locations of a cell or at the whole cell level, a subscriber is not able to perform a call setup even though the radio conditions at the UE side are good. This could happen especially when the issue is at the network side, in particular at the RBS. In one example this could be due to Uplink (UL) interference at the RBS, in another example this could be due to software or hardware issues at the RBS. With current standards for cell selection/reselection using the RSRP and RSRQ measurements, the UE will not reselect any other cell as long as the radio conditions are good at the UE side. As a consequence consecutive call setup requests might fail and the UE will be 'trapped' in the problematic cell without being able to perform any cell reselection towards neighboring cells. Solutions exist to address this cell trapping problem, but a deficiency of existing solutions is that they may result in a cell recovery delay whereby the UE is influenced to stay in a more distant cell, rather than moving back to closest cell, when the interference issue has been resolved.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Generally, when an arrangement is referred to herein, it is to be understood as a physical product, e.g., an apparatus. The physical product may comprise one or more parts, such as controlling circuitry in the form of one or more controllers, one or more processors, or the like.

It is an object of some embodiments to solve or mitigate, alleviate, or eliminate at least some of the above-identified deficiencies in the art or other disadvantages.

According to a first aspect, this object is achieved by a method of a wireless device for assisting call setup recovery in a wireless network, the wireless network comprising an operation support system, OSS, and a plurality of radio base stations, RBSs, each RBS providing one or more cells. The method comprises registering of a set number of consecutive call setup failures to an RBS providing a first cell. The method further comprises initiating a cell reselection procedure to a RBS providing a default cell, and providing, at call setup in the default cell, a call setup failure report to the RBS providing the default cell, wherein the call set up failure report comprises information on the call setup failures to the RBS providing the first cell. Additionally the method comprises causing forwarding of the call setup failure report from the RBS providing the default cell to the OSS, wherein the forwarding of the call setup failure report is caused in compliance with a latency constraint for call setup recovery.

In some embodiments, the method comprises associating location information for the wireless device to respective one or more call setup failures of the set number of consecutive call setup failures, wherein the location information may comprise information relating to a geographical position when registering call setup failures of the wireless device in the first cell.

In some embodiments, the method comprises receiving information regarding a call setup recovery activity from the RBS providing the default cell, wherein the information may comprise a recovery index M that is a number lower than the set number of consecutive call setup failures.

According to a second aspect, the object is achieved by a computer program product comprising a non-transitory computer readable medium, having thereon a computer program comprising program instructions. The computer program is loadable into data processing circuitry and configured to cause execution of the method according to the first aspect when the computer program is run by the data processing circuitry.

According to a third aspect, the object is achieved by an arrangement for assisting call setup recovery in a wireless network, the wireless network comprising an operation support system, OSS, and a plurality of radio base stations, RBSs, each RBS providing one or more cells. The arrangement comprises processing circuitry configured to cause registering of a set number of consecutive call setup failures to an RBS providing a first cell. The processing circuitry is further configured to cause initiating of a cell reselection procedure to an RBS providing a default cell and a providing, at call setup, in the default cell, of a call setup failure report to the RBS providing the default cell, wherein the call set up failure report comprises information on the call setup failures to the RBS providing the first cell. Additionally, the processing circuitry is configured to cause forwarding of the call setup failure report from the RBS providing the default cell to the OSS, wherein the forwarding of the call setup failure report is caused in compliance with a latency constraint for call setup recovery.

According to a fourth aspect, the object is achieved by a host computer comprising the arrangement according to the third aspect.

According to a fifth aspect, this object is achieved by a method of a radio base station, RBS, providing a default cell, for assisting call setup recovery in a wireless network, the wireless network comprising an operation support system, OSS, and a plurality of radio base stations, RBSs, comprising the RBS providing the default cell and each RBS providing one or more cells. The method comprises receiving, in association with call setup with a wireless device, a call setup failure report from the wireless device, wherein the call setup failure report comprises information on a set number of consecutive call setup failures determined by the wireless device during call setup attempts to an RBS providing a first cell. The method further comprises obtaining a report forwarding request; and forwarding, responsive to the report forwarding request, the call setup failure report to the OSS, wherein the forwarding is performed in compliance with a latency constraint for call setup recovery.

According to a sixth aspect, the object is achieved by a computer program product comprising a non-transitory computer readable medium, having thereon a computer program comprising program instructions. The computer program is loadable into data processing circuitry and configured to cause execution of the method according to the fifth aspect when the computer program is run by the data processing circuitry.

According to a seventh aspect, the object is achieved by an arrangement for assisting call setup recovery in a wireless network, the wireless network comprising an operation support system, OSS, and a plurality of radio base stations, RBSs, each RBS providing one or more cells. The arrangement comprises processing circuitry configured to cause receiving, in association with call setup with a wireless device, of a call setup failure report from the wireless device, wherein the call setup failure report comprises information on a set number of consecutive call setup failures determined by the wireless device during call setup attempts to an RBS providing a first cell. The processing circuitry is further configured to cause obtaining of a report forwarding request and forwarding, responsive to the report forwarding request, of the call setup failure report to the OSS, wherein the forwarding is performed in compliance with a latency constraint for call setup recovery.

According to an eighth aspect, the object is achieved by a host computer comprising the arrangement according to the seventh aspect.

According to a ninth aspect, this object is achieved by a method of an operation support system, OSS, for assisting call setup recovery in a wireless network, the wireless network comprising the OSS, and a plurality of radio base stations, RBSs, each RBS providing one or more cells. The method comprises receiving a call setup failure report from an RBS providing a default cell, wherein the call setup failure report comprises information on a set number of consecutive call setup failures determined by a wireless device during preceding call setup attempts to an RBS providing a first cell. The method further comprises determining a call setup recovery activity for call setup in the first cell; and initiating (S43) the call setup recovery activity in at least the radio base station of the first cell, wherein the initiating is performed in compliance with a latency constraint for call setup recovery.

According to a tenth aspect, the object is achieved by a computer program product comprising a non-transitory computer readable medium, having thereon a computer program comprising program instructions. The computer program is loadable into data processing circuitry and configured to cause execution of the method according to the ninth aspect when the computer program is run by the data processing circuitry.

According to an eleventh aspect, the object is achieved by an arrangement for assisting call setup recovery in a wireless network, the wireless network comprising an operation support system, OSS, and a plurality of radio base stations, RBSs, each RBS providing one or more cells. The arrangement comprises processing circuitry configured to cause receiving of a call setup failure report from an RBS providing a default cell, wherein the call setup failure report comprises information on a set number of consecutive call setup failures determined by a wireless device during preceding call setup attempts to an RBS providing a first cell. The processing circuitry is further configured to cause registering of a call setup recovery activity for call setup in the first cell and initiating of the call setup recovery activity in at least the radio base station of the first cell, wherein the initiating is performed in compliance with a latency constraint for call setup recovery.

According to a twelfth aspect, the object is achieved by a host computer comprising the arrangement according to the eleventh aspect.

In some embodiments, any of the above aspects may additionally have features identical with or corresponding to any of the various features as explained above for any of the other aspects.

An advantage of some embodiments is that improved and more expedient procedures are provided for call setup failure recovery in real time and for cell reselection due to call setup failure.

Another advantage of some embodiments is faster call setup in a wireless network experiencing location based call setup problems.

Other advantages comprise improved subscriber experience in that information relating to call setup failures and call setup recovery procedures may be distributed to one or more RBSs providing respective cells in the wireless network, thereby enabling preventive actions to minimize problems due to call setup failures.

BRIEF DESCRIPTION OF DRAWINGS

Further objects, features and advantages will appear from the following detailed description of embodiments, with reference being made to the accompanying drawings. The drawings are not necessarily to scale, emphasis instead being placed upon illustrating the example embodiments.

DETAILED DESCRIPTION

Figure 1:
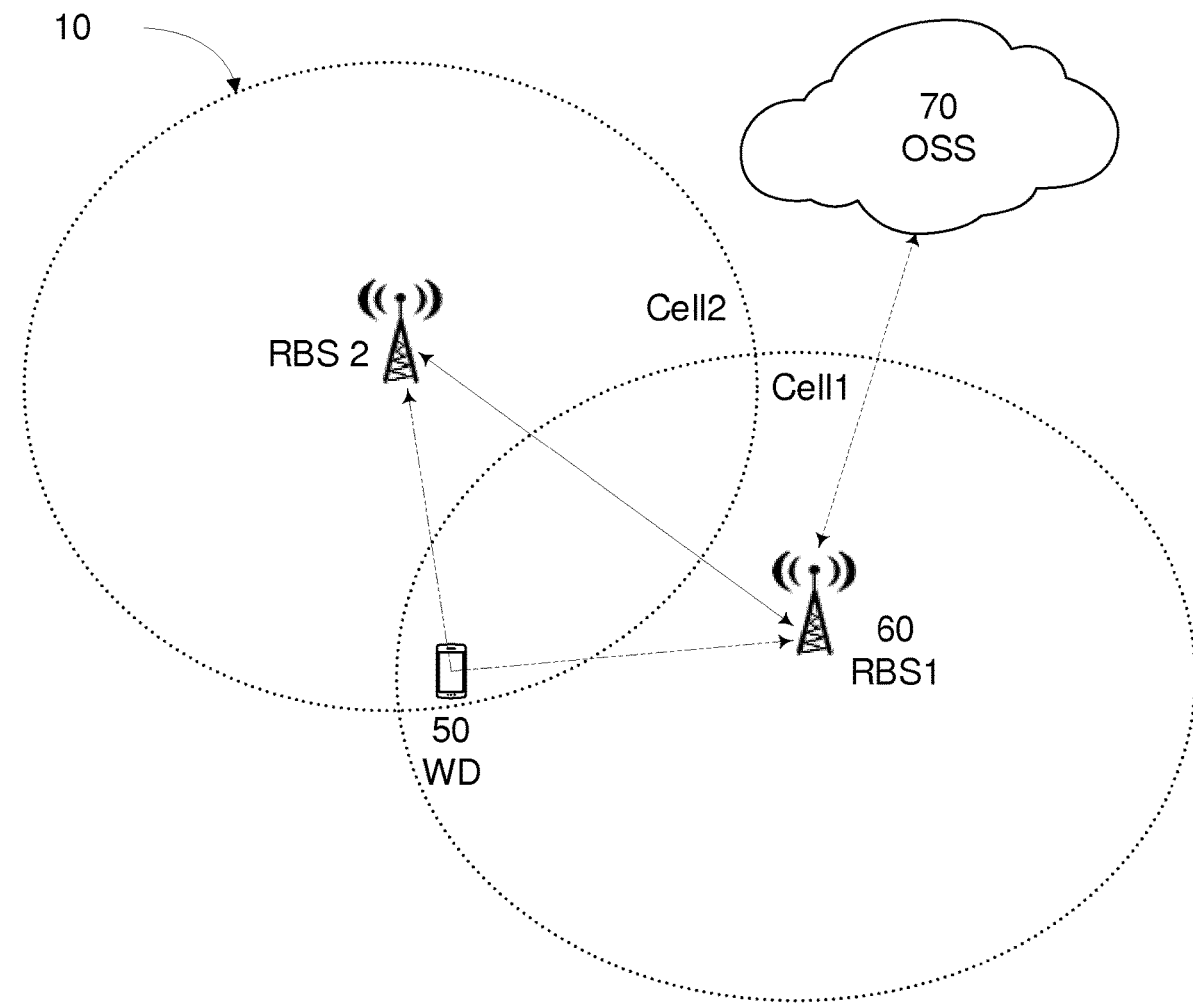
FIG. 1 schematically illustrates a wireless network.

Aspects of the present disclosure will be described more fully hereinafter with reference to the accompanying drawings. The methods and arrangements disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the invention. As used herein, the singular forms "a", "an" and "the" are intended to include the plural forms as well, unless the context clearly indicates otherwise. In the context of the present disclosure "comprises/comprising" is taken to specify the presence of stated features, integers, steps, or components, but does not preclude the presence or addition of one or more other features, integers, steps, components, or groups thereof.

In the following disclosure, the term wireless device will be used to refer to remote wireless equipment that are configured for wireless access to a network node, e.g., a mobile device (MD), mobile station (MS), user equipment (UE), subscriber station, remote terminal, wireless terminal, or any other type of user device such as a mobile telephone or smartphone.

A network infrastructure component that provides wireless access to the wireless device will be referred to as an access node. Depending on the network type, other well-known terms for such a network entity are radio base station (RBS), NodeB, eNodeB, gNodeB, or access point. These terms may be used interchangeably and are used to refer to network infrastructure components that provide wireless access to wireless devices.

FIG. 1 schematically illustrates a wireless network 10 comprising a plurality of radio cells, provided by corresponding radio access nodes, here illustrated as radio base stations. In the schematic illustration of FIG. 1 a first cell, Cell 1 is provided by a first radio base station 60, RBS1 and a second cell, Cell 2, is provided by a second radio base station, RBS 2. An operations support system 70, OSS, is provided to support the network configuration, e.g., by configuring parameters of the RBSs. A wireless device 50 may be camping in the first or second cell, or have an established call with at least one RBS providing a serving cell. The cells of the wireless network may be at least partially overlapping and some cells may be configured as micro cells within a macro cell.

As previously discussed in the background section, an idle mode wireless device, e.g., a UE, follows a call set up procedure when attempting to set up a call to a RBS providing a cell in which the idle mode UE is camping. During the call setup procedure cell priority and received radio conditions at UE side, e.g., Reference Signal Received Power (RSRP) and Reference Signal Received Quality (RSRQ) are considered in the cell selection procedure. The same applies to cell re-selection, where a call set up failure in an initial cell brings about a cell reselection attempt based on RSRP and RSRQ measurements.

In any wireless network, it might happen that at some geographical locations of a cell or at the whole cell level, a subscriber is not able to perform a call setup even though the radio conditions at the UE side are good. This could happen especially when the issue is at the network side, in particular at the RBS. In one example this could be due to Uplink (UL) interference at the RBS, in another example this could be due to software or hardware issues at the RBS. With current standards for cell selection/reselection using the RSRP and RSRQ measurements, the UE will not reselect any other cell as long as the radio conditions are good at the UE side (see e.g., 4G standard 3GPP TS 36.304). Whenever the UE is in idle mode, in addition to the cell priority, only the received radio conditions at UE side e.g. RSRP (Reference Signal Received Power) and RSRQ (Reference Signal Received Quality) are considered in the cell reselection procedure. As a consequence, consecutive call setup requests might fail and the UE may be 'trapped' in the problematic cell without being able to perform any cell reselection towards neighboring cells. Solutions exist to address this cell trapping problem, but a deficiency of existing solutions is that they may result in a cell recovery delay whereby the UE is influenced to stay in a more distant cell rather than moving back to closest cell when the interference issue has been resolved.

Figure 2:
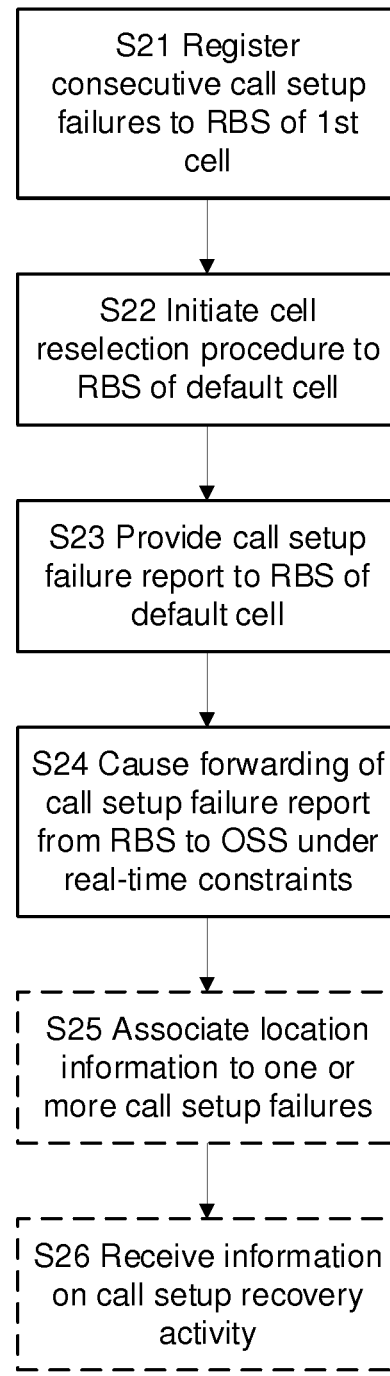
FIG. 2 is a flowchart illustrating example method steps according to some embodiments.

FIG. 2 is a flowchart illustrating example method steps according to some embodiments that overcomes the above disclosed problems and disadvantages. FIG. 2 illustrates a method performed in a wireless device for assisting call setup recovery in a wireless network, e.g., as exemplified in FIG. 1. The wireless network comprises an operation support system, OSS, and a plurality of radio base stations, RBSs, wherein each RBS provides one or more cells.

FIG. 2 discloses method steps performed for assisting call set up recovery in a wireless device. In its most general form, the method is invoked by the registering S21 in the wireless device of a set number of consecutive call setup failures to an RBS providing a first cell. In the example of FIG. 1, the wireless device 50 sends a call setup request, e.g., an RRCConnectionRequest (CR) (3GPP TS 36.331 RRC (Radio Resource Control) specification) message, to the serving Radio Base Station (RBS), RBS1. If the message is lost or corrupted on the air interface, it will not be perceived by RBS1 and no acknowledgement message in response to the call setup request. The wireless device will determine the call setup request as failed and may resend the call setup request one or more further times until registering that a set number of consecutive call setup failures have been experienced when trying request call setup with the RBS of the first cell. As the consecutive RRCConnectionRequest messages from are not received by the RBS providing the first cell, the RBS is unaware of the consecutive call setup failures experienced by the wireless device.

In response to registering S21 the set number of consecutive call setup failures to an RBS providing a first cell, the wireless device initiates S22 a cell reselection procedure to an RBS providing a default cell, e.g., a neighboring cell of the first cell such as a macro cell, and adjacent micro cell or any other type of cell capable of serving the wireless device. Thus, when the wireless device experiences N consecutives call setup failures on the first cell, a cell reselection procedure is triggered towards a default cell, e.g., a neighboring cell, and as a result the wireless device will trigger the call setup on default cell. It will be understood that the cell reselection procedure may also be triggered towards a second cell, e.g., a neighboring micro cell, and that the procedure of registering S21 a set number of consecutive call setup failures may be repeated also for call setup attempts in such a second cell. In some embodiments the RBS providing the first cell is a first RBS and the RBS providing the default cell is a default RBS different from the first RBS. The default cell may also, according to some embodiments, be provided by the RBS providing the first cell.

When call setup is successful to the RBS providing the default cell, the wireless devices provides S23 a call setup failure report to the RBS providing the default cell, wherein the call set up failure report comprises information on the call setup failures to the RBS providing the first cell, and possibly also information on additional call setup failures to an RBS providing a second cell. In the following disclosure, the reporting will only be discussed in terms of call setup failures to an RBS providing a first cell. However, the skilled person will understand that the presented procedure is equally applicable for call setup failures also in further cells. The wireless device provides a report comprising information relating to an 'N call setup failures issue' in the first cell. Additionally, the wireless device causes S24 forwarding of the call setup failure report from the RBS providing the default cell to the OSS. According to some embodiments, the call setup failure report comprises information regarding the OSS as an intended recipient of the call setup failure report. According to alternative embodiments, the RBS has been preconfigured to forward any received call setup failure report to the OSS. Thus, the providing of the call set up report from the wireless device to a receiving RBS will cause forwarding to the call set up failure report to the OSS.

The forwarding of the call setup failure report is caused in compliance with a latency constraint for call setup recovery. According to some embodiments, the RBS providing the default cell will forward the received call setup failure report, to the OSS in immediate response to receiving the report. The wireless device experiencing a set number of consecutive call setup failures to the RBS providing the first cell, e.g., N call setup failures on the first cell, provides the report via an already standardized procedure e.g. via connEstFailReport (3GPP TS 36.331; RRC (Radio Resource Protocol) specifications) or via a new modified message, e.g., a modified RRCConnectionRequest containing a new field representing the call setup report to the receiving RBS about, e.g., comprising information relating to a time and type of call setup failure experienced on the first cell. Thus, in the context of the present disclosure, the latency constraint for call setup recovery implies that the RBS is caused to forward the call setup failure report in immediate response to receiving the report and that the OSS is caused to trigger a call setup recovery procedure in immediate response to receiving the call setup failure report. Call setup from the RBS providing the first cell will be enabled directly following success of the call setup recovery procedure and the wireless devices can revert back to the recovered cell without such latencies that are experienced in prior art timer based solutions. The wireless device causes S24 forwarding of the call setup failure report from the RBS providing the default cell to the OSS, e.g., the OSS as disclosed in FIG. 1. The receiving OSS may, as illustrated in FIG. 1, be configured to control also the RBS providing the first cell, but the disclosed method is also applicable in a network configuration comprising a plurality of operation support systems that are configured for network service control of respective one or more RBSs.

In some embodiments, the wireless device associates S25 location information for the wireless device to respective one or more call setup failures of the set number of consecutive call setup failures. In some embodiments, the location information may be included in the call setup failure report; implying that associating of the location information also may be performed as an earlier step in the wireless device procedure. Such location information may comprise an identifier of the first cell or a geographical position when registering call setup failures in the first cell. Whenever a cell, e.g., the first cell, is considered as 'problematic', i.e., following determination of a set number of consecutive call setup failures, the wireless device may be requested to provide location information. A request may be sent to the wireless device to provide the location information with an association to the information provided in the call setup failure report, e.g., by asking the wireless device, via broadcasted System Information in the first cell, to report their locations. The associating of the location information may be performed by requesting any new wireless device that makes a call setup attempt on the problematic first cell to report its location during its call setup. This is done for all wireless devices whether their call will succeed or not. Alternatively, the wireless devices that experience the call setup failures at the first cell, have to report their location in the call setup report provided during call setup to the default cell. In some embodiments, the wireless device may also include information relating to beam measurements in the call setup failure report.

As will be described further below, location information may also be associated to the wireless device by means of the default RBS. In one example, during wireless device call setup on the default cell, the network sends a timing advance to the wireless device as part of a call setup synchronization procedure. The timing advance may allow the network to assess the location of the wireless device. In another example while accessing the default cell, any standard prior art procedure for locating the wireless device, e.g., Observed Time Difference of Arrival (OTDOA) or others well known techniques for locating might be used.

When the call setup problems have been addressed and solved within the network, recovery of the first cell will be initiated. According to some embodiments, the wireless device receives S26 information regarding a call set up recovery activity from the RBS providing the default cell, wherein the received information may comprise a recovery index M that is a number lower than the set number of consecutive call setup failures. Thus, when reinitiating the call setups to the first cell, the wireless device may be instructed to initiate cell reselection if only a few or a limited number of call setup failures are experienced, i.e., using the recovery index M as the threshold representing the set number of consecutive call setup failures in step S21.

Figure 3:
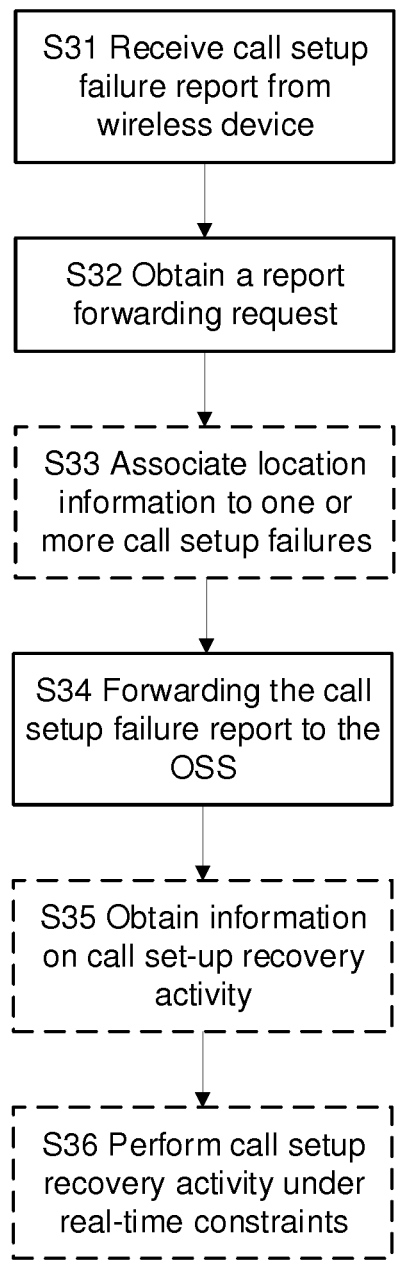
FIG. 3 is a flowchart illustrating example method steps according to some embodiments.

FIG. 3 is a flowchart illustrating example method steps according to some embodiments. FIG. 3 illustrates a method of a radio base station, RBS, providing a default cell, for assisting call setup recovery in a wireless network e.g., as exemplified in FIG. 1. The wireless network comprises an operation support system, OSS, and a plurality of radio base stations, RBSs, wherein each RBS provides one or more cells.

FIG. 3 discloses method steps performed for assisting call set up recovery in a radio base station, RBS, providing a default cell. In its most general form, the method is invoked by receiving S31, in association with call setup with a wireless device, a call setup failure report from the wireless device, wherein the call setup failure report comprises information on a set number of consecutive call setup failures determined by the wireless device during call setup attempts to an RBS providing a first cell. Thus, when call setup is successful to the RBS providing the default cell, the RBS receives a call setup failure report. This step corresponds to the step performed in the wireless device, whereby a call set up failure report is provided S23 to the RBS at call set up in the default cell. The report comprises information relating to an 'N call setup failures issue' in the first cell. In some embodiments the RBS providing the first cell is a first RBS and the RBS providing the default cell is a default RBS different from the first RBS. The default cell may also, according to some embodiments, be provided by the RBS providing the first cell. It will be appreciated that the RBS may in fact receive a number of call setup failure reports, wherein each report is provided by a wireless device having experienced a call setup failure when attempting to set up a call in the first cell. The RBS will process each call setup failure report individually.

Additionally, the radio base station obtains S32 a report forwarding request, e.g., an explicit request in the message received from the wireless device or an implicit request, whereby receipt of one or more call setup failure report from respective wireless devices is perceived as a forwarding request. Responsive to receiving the report forwarding request, the radio base station forwards S34 the call setup failure report to the OSS, wherein the forwarding is performed in compliance with a latency constraint for call setup recovery, i.e., to trigger self-healing or self-optimizing algorithms implemented on the OSS. Thus, in the context of the present disclosure, the latency constraint for call setup recovery implies that the RBS is caused to forward the call setup failure report in immediate response to receiving the report and that the OSS is caused to trigger a call setup recovery procedure in immediate response to receiving the call setup failure report. Call setup from the RBS providing the first cell will be enabled directly following success of the call setup recovery procedure and the wireless devices can revert back to the recovered cell without such latencies that are experienced in prior art timer based solutions.

The wireless device may be asked by the network, i.e., the RBS providing the default cell (via broadcasted SI or via any other means) to report its location. When the wireless device accesses the default cell, after reaching the set number of consecutive call setup failures in the first cell, the wireless device initiates a call setup procedure with the default cell and provides the call setup failure report. However, if the wireless device does not include the location in the report, the RBS providing the default cell will attempt to estimate the location of the wireless device while accessing the default cell by using any suitable, e.g., prior art, location procedures. For example, during the wireless device call setup on the default cell, the network sends a timing advance to the wireless device as part of the call setup synchronization procedure. The use of the value of timing advance will allow the network to estimate a location of the wireless device. Alternatively, any standard prior art procedure for locating the wireless device like OTDOA (Observed Time Difference of Arrival) or others might be used. Some proposed procedures will give the location of the wireless device when accessing the default cell, but corrections of the location may be calculated prior art algorithms, e.g. by taking into consideration the speed of the wireless device. Thus, according to some embodiments, the RBS may obtain location information for the wireless device by estimating a location of the wireless device when detecting a call setup attempt from the wireless device and associates S33 location information for the wireless device to one or more call setup failures of the set number of consecutive call setup failures and includes this location information when forwarding the call setup failure report to the OSS.

In some embodiments, the radio base station obtains S35 information on a call-set up recovery activity from the OSS, wherein the information obtained from the OSS may comprise a recovery index M that is a number lower than the set number of consecutive call setup failures. The radio base station may perform S36 the call setup recovery activity in response to receiving the information, wherein the call-setup recovery activity is performed in compliance with a latency constraint for call setup recovery. As will be explained further below, the call set-up recovery activity and procedure may comprise signaling information on the call-set up recovery activity to at least the RBS providing the first cell. Thus, in the context of the present disclosure, the latency constraint for call setup recovery implies that the RBS is caused to forward the call setup failure report in immediate response to receiving the report and that the OSS is caused to trigger a call setup recovery procedure in immediate response to receiving the call setup failure report. Call setup from the RBS providing the first cell will be enabled directly following success of the call setup recovery procedure and the wireless devices can revert back to the recovered cell without such latencies that are experienced in prior art timer based solutions.

When a cell, e.g., the first cell, is declared problematic, neighbors of the first cell may be notified about the call setup issue. The notification may be received from the RBS providing the default cell via an X2 or Xn link or from the OSS having received the call setup failure report. The default cell, as well as any other neighbor cell that receives the notification will broadcast, e.g. via one SIB, to all its wireless devices information that the first cell is experiencing a call setup failure issue and may also send the value of an integer M where M<N to be used as the call setup recovery activity. A wireless device may perform the call setup recovery activity, initiated by an attempt to select/reselect the first cell from the neighbor cell/default cell. As part of a call setup recovery the wireless device, may upon receipt of a first call setup failure in the first cell perform only M call setups (where M usually is equal to 1 or 2) on the first cell and in case the wireless device experiences M call setup failures on the first cell it will revert to the default cell or attempt a call setup in another neighbor cell, i.e., a second cell. Alternatively, the wireless device will refrain from making another call setup attempt on the first cell as it is announced as problematic and the wireless device will directly revert to the default cell or attempt a call setup in another neighbor cell, i.e., a second cell. Thus, according to the second alternative, no system information needs to be transmitted from the RBS. When the OSS or the RBS providing the first cell considers that the call setup failure issue has been resolved, information is transmitted to one or more neighbor cells that the call setup recovery activity has succeeded and that any broadcasting of system information relating to the call setup failure experienced in Cell 1 may cease.

Figure 4:
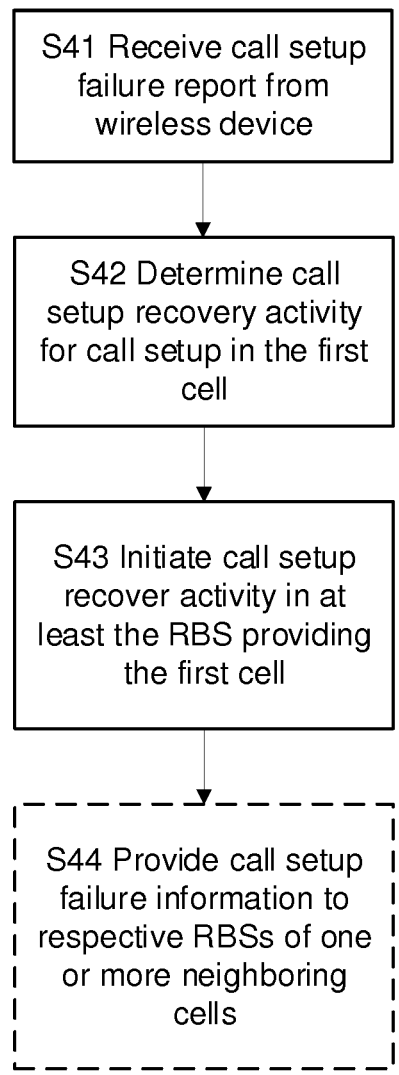
FIG. 4 is a flowchart illustrating example method steps according to some embodiments.

FIG. 4 is a flowchart illustrating example method steps according to some embodiments that overcomes the above disclosed problems and disadvantages. FIG. 4 illustrates a method performed in an operation support system, OSS, for assisting call setup recovery in a wireless network, e.g., as exemplified in FIG. 1. The wireless network comprises the OSS and a plurality of radio base stations, RBSs, wherein each RBS provides one or more cells.

FIG. 4 discloses method steps performed for assisting call set up recovery in a wireless device. In its most general form, the method is invoked by receiving S41 at least one call setup failure report from an RBS providing a default cell, wherein the call setup failure report comprises information on a set number of consecutive call setup failures determined by a wireless device during preceding call setup attempts to an RBS providing a first cell. In some embodiments, the received call setup failure report is a report originated in a wireless device in a response to a call setup attempt in the first cell, the report being forwarded by the RBS providing the default cell, following a call setup by the wireless device to the RBS providing the default cell. Consequently, when setting up the call to the RBS providing the default cell, the wireless device provides information not only to the RBS providing the default cell, but also to the OSS. The information aimed at the OSS, comprises a call setup failure report disclosing a call setup failure issue involving a set number, e.g., N, of consecutives call setup failures has occurred on the first cell. Thus, the OSS receives information of the call setup failure issue in the first cell.

In the OSS, a call setup recovery activity is determined S42 for call setup in the first cell e.g., by selecting one or more algorithms implemented in the OSS for auto-healing or self-optimizing of the network The OSS initiates S43 the call setup recovery activity in at least the radio base station of the first cell, wherein the initiating is performed in compliance with a latency constraint for call setup recovery. Thus, in the context of the present disclosure, the latency constraint for call setup recovery implies that the OSS receives the call setup failure report in direct response to the report being received by a receiving RBS and that the OSS is caused to trigger a call setup recovery procedure in immediate response to receiving the call setup failure report. Call setup from the RBS providing the first cell will be enabled directly following success of the call setup recovery procedure and the wireless devices can revert back to the recovered cell without such latencies that are experienced in prior art timer based solutions.

In some embodiments, the call setup failure report comprises location information for the wireless device, wherein the location information is associated to respective one or more call setup failures. The location information may comprise an identifier for the default cell and/or information relating to a geographical position at the call setup failure of the wireless device in the first cell. The OSS uses the location information to determine whether the call setup failure issue is occurring in the entire first cell or whether it is experienced only in some particular locations of the first cell. Having information regarding the locations of the UE which have failed on Cell1, it can have an accurate estimate about whether the calls are failing at cell level or at some particular call locations. For example, if during a predefined period of time, T, a plurality of call setup failures on the first cell have been reported to the default cell, two outcomes will follow:

Outcome 1: if during T there was zero successful calls on the first cell AND all reported calls on the default cells belong to different locations, THEN the algorithm declares the first cell as a whole as problematic.

Outcome 2: If at least one call setup is successful on the first cell, THEN independently of the locations of the reported wireless device to the RBS of the default cell, the call setup failures issue will be addressed as not occurring at a cell level but rather at some specific locations of the cell.

Turning back to the scenario where the call setup failure issue is considered to be occurring at a cell level, the OSS will declare the first cell as barred implying that no calls are allowed on the barred cell. The OSS implements a recovery activity, either allowing a timer set by the operator to determine when the cell is to be un-barred or un-barring the cell in response to an action triggered on the first cell, e.g., an alarm disappearance, site restart of the RBS providing the first cell, Cell1 or parameter change.

Following un-barring of the first cell, the OSS will consider the call setup issue to be solve if a predefined number of call setups coming from different wireless devices succeed with call setup in the first cell. If the call setup failure issue occurs again for one or more wireless devices attempting to set up a call in the first cell, the OSS will repeat the above disclosed procedures.

For a scenario where the recovery activity only needs to be implemented with regard to a specific geographic location within the cell, the following recovery activities will be initiated. The OSS instructs the RBS providing the first cell to send to all wireless devices within the cell, a notification containing the information that a call setup issue exists in the first cell. Secondly, a recovery index M is included in the notification, where M<N and usually is equal to 1 or 2. The notification could be sent via one of the broadcasted SIB (System Information Block) or it could be sent via any dedicated signaling message during call setup. After receiving the notification, the wireless devices will initiate the re-selection procedure to the default cell in response to reaching the number of consecutive call setup failures as defined by the recovery index. Thus, re-selection may be initiated more promptly, resulting in an earlier addressing of the call setup issue as well as reduced latency for call setup when a wireless device is within a coverage area of the first cell as well as the default cell. The use of a recovery index lower than the set number of consecutive call setup failures used to establish the existence of the call setup issue is justified as the network already knows in advance that there is an issue in some locations of the cell and hence it is a waste of signaling and time that each time a wireless device passes by any of those location it has to try the original number of call setup attempts, N, rather than the reduced number that the recovery index represents. In other words, the network does not broadcast the location where the failures are occurring, but a recovery index to be used by the wireless device in order to expedite a redirection or recovery procedure.

In some embodiments, the OSS additionally performs the further step of providing S44 call setup failure information to respective RBSs of one or more respective neighboring cells of the default cell in response to receiving the call setup failure report.

When a call setup issue is identified within the first cell and the first cell is declared problematic, benefits may be achieved by providing information to some or all neighbors that the cell is problematic so that all wireless devices camping within those neighbor cells know in advance the problem and might take necessary precautions in order to minimize the effect of the problem. According to aspects of the present disclosure, the following procedure is proposed. The OSS provides information to some or all neighbors of the first cell about the call setup issue in the first cell. As an alternative to providing this information directly from the OSS to the respective RBSs, the OSS may also instruct the RBS providing the first cell to send a notification neighboring RBSs, via a link connecting RBS providing the first cell and its neighbor RBSs e.g. via X2 link in case of 4G or via Xn in case of 5G. Whenever a neighbor cell, e.g. the default cell, receives the notification the RBS providing the cell may broadcast, e.g. via one SIB, to all its wireless devices, two types of information: First that the first cell is experiencing a call setup failure issue and a value of a recovery index M, lower than the set number of consecutive call setup failures used to determine the existence of the call set up failure issue. The recovery index will be used by the wireless devices receiving this information to more quickly initiate a cell-reselection procedure. Cell reselection to an RBS providing the default cell will be initiated when reaching a number of consecutive call setup failures corresponding to the recovery index. Alternatively, when a recovery index is not included in the notification, the wireless device proceeds with reselection to a neighboring cell, e.g., to the default cell.

When the RBS providing the first cell considers that the all setup failures issue has been overcome, e.g., in response to receiving information from the OSS and having performed the recovery algorithm, all neighbor cells may be notified so that they stop further broadcasting of the call setup failure issue.

In a scenario where an emergency call or a communication with low latency requirements are initiated in the first cell, the reselection procedure may be initiated more quickly than proposed above, e.g., by providing an emergency index to the wireless devices within a cell to be used as a basis for a cell reselection decision when attempting to setup an emergency call.

Figure 5A:
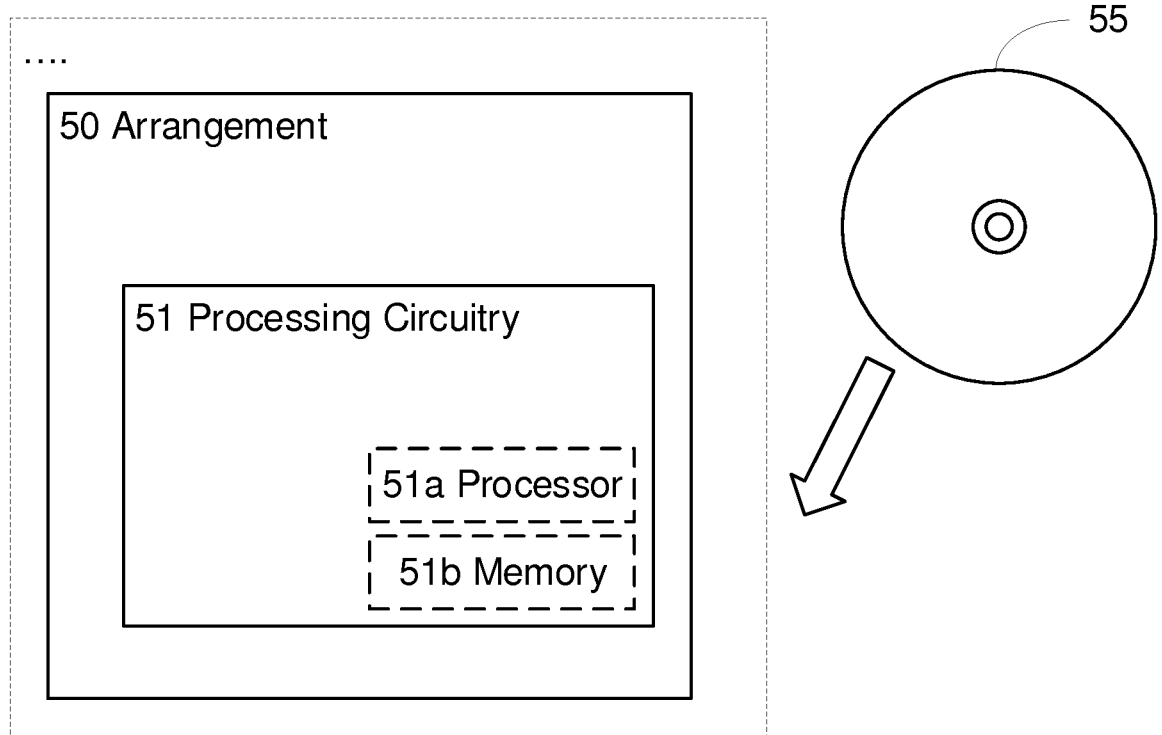
FIG. 5a is a schematic drawing of a block diagram illustrating an example arrangement and a computer readable medium according to some embodiments.

FIG. 5a is a schematic block diagram illustrating an example arrangement 50 for assisting call setup recovery in a wireless network, the wireless network comprising an operation support system, OSS, and a plurality of radio base stations, RBSs, each RBS providing one or more cells, e.g., as illustrated in FIG. 1.

FIG. 5a also illustrates an example computer program product 55 comprising a non-transitory computer readable medium, having thereon a computer program comprising instructions. The computer program product comprises a computer readable medium such as, for example a universal serial bus (USB) memory, a plug-in card, an embedded drive or a read only memory (ROM). The computer readable medium has stored thereon a computer program comprising program instructions. The computer program is loadable into a processing circuitry 51, which may, for example, be comprised in a host computer of a wireless device. When loaded into the processing circuitry 51, the computer program may be stored in a memory 51b associated with or comprised in the processing circuitry. According to some embodiments, the computer program may, when loaded into and run by the processing circuitry, cause execution of the above described method steps.

Thus, the computer program is loadable into data processing circuitry, e.g., into the processing circuitry 51 of FIG. 5a, and is configured to assist call setup recovery in a wireless network. Thus, the example arrangement of FIG. 5a may, for example, be configured to perform method steps described in connection with FIG. 2.

The arrangement comprises processing circuitry 51 configured to cause registering of a set number of consecutive call setup failures to an RBS providing a first cell. The processing circuitry is further configured to cause initiating of a cell reselection procedure to an RBS providing a default cell and a providing, at call setup, in the default cell, of a call setup failure report to the RBS providing the default cell, wherein the call set up failure report comprises information on the call setup failures to the RBS providing the first cell. Additionally, the processing circuitry is configured to cause forwarding of the call setup failure report from the RBS providing the default cell to the OSS, wherein the forwarding of the call setup failure report is caused in compliance with a latency constraint for call setup recovery.

According to aspects of the disclosure, the processing circuitry comprises a processor 51a and a memory 51b. The processor 51a may be any suitable type of computation unit or circuit, e.g. a microprocessor, digital signal processor, DSP, field programmable gate array, FPGA, or application specific integrated circuit, ASIC or any other form of circuitry. It should be appreciated that the processing circuitry need not be provided as a single unit, but may be provided as any number of units or circuitry. According to aspects of the disclosure, the arrangement may be implemented in a host computer of a wireless device. The memory may be any suitable type of computer readable memory capable of storing instructions of a computer program and may be of volatile and/or non-volatile type.

Figure 5B:
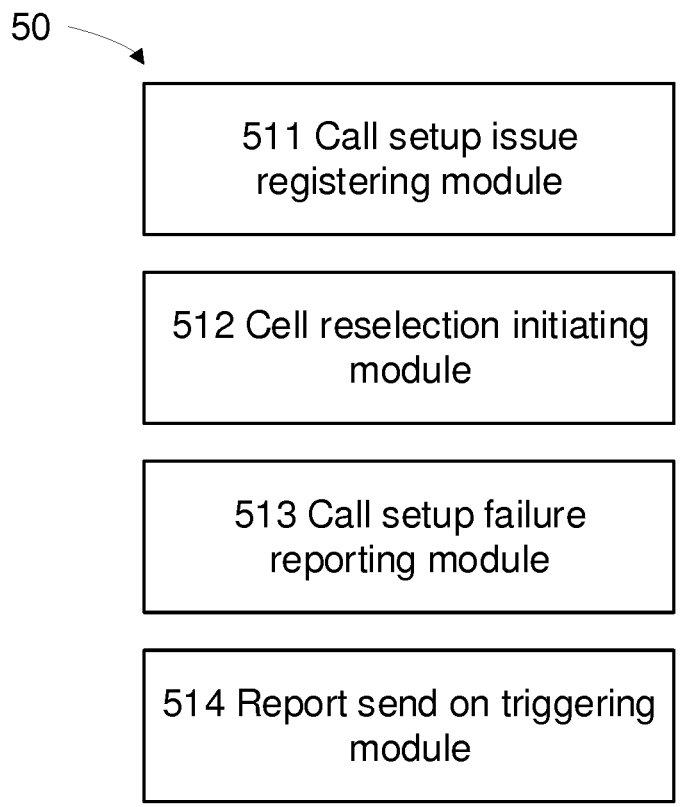
FIG. 5b is a schematic block diagram illustrating an example arrangement according to some embodiments.

FIG. 5b provides another schematic block diagram illustration of the arrangement. The arrangement comprises call setup issue registering module 511 configured to cause registering of a set number of consecutive call setup failures to an RBS providing a first cell; for example, the registering module 511 may be configured to determine the set number of consecutive call setup failures. The arrangement further comprises a cell reselection initiating module 512 configured to cause initiating of a cell reselection procedure to an RBS providing a default cell; for example, the cell reselection initiating module 512 may be configured to initiate the cell reselection procedure. The arrangement also comprises a call setup failure reporting module 513 configured to cause providing of a call setup failure report to the RBS providing the default cell; for example the call setup failure reporting module may be configured to provide the call setup failure report to the RBS. As previously mentioned, the call set up failure report comprises information on the call setup failures to the RBS providing the first cell. Additionally, the arrangement comprises a report send on triggering module 514 configured to cause forwarding of the call setup failure report from the RBS providing the default cell to the OSS, wherein the forwarding of the call setup failure report is caused in compliance with a latency constraint for call setup recovery.

The example arrangement of FIG. 5b may, for example, be configured to perform method steps described in connection with FIG. 2.

Figure 6A:
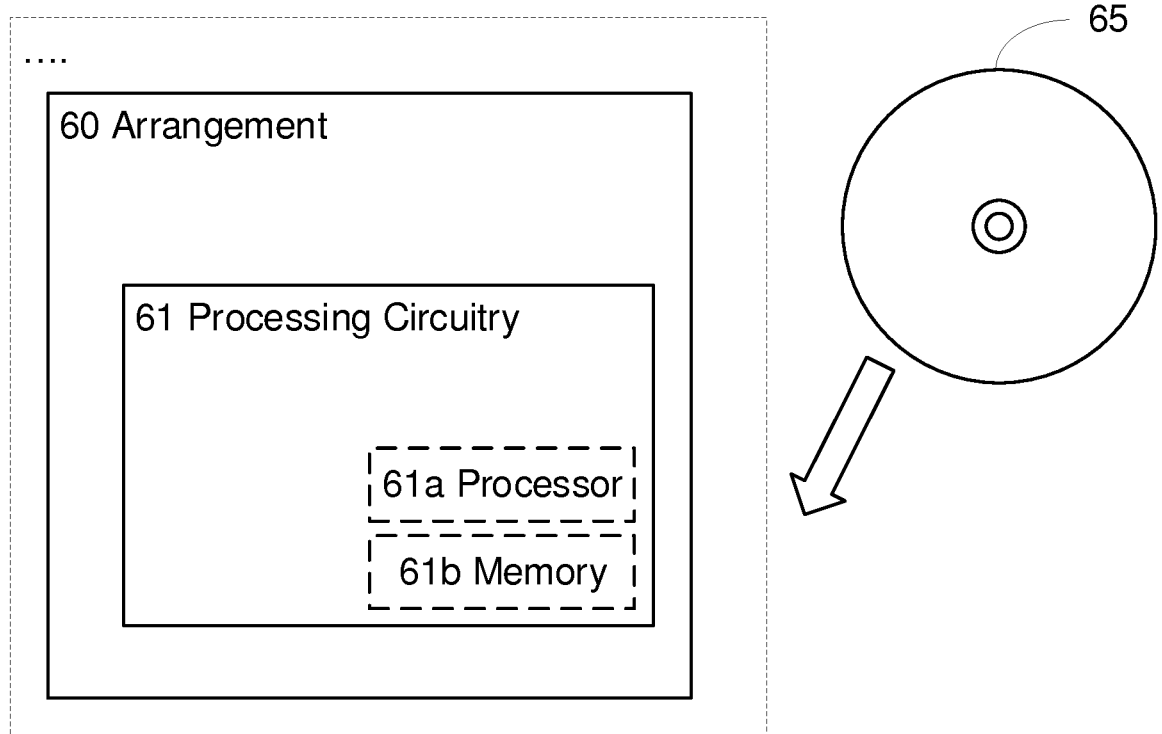
FIG. 6a is a schematic drawing of a block diagram illustrating an example arrangement and a computer readable medium according to some embodiments.

FIG. 6a is a schematic block diagram illustrating an example arrangement 60 for assisting call setup recovery in a wireless network, the wireless network comprising an operation support system, OSS, and a plurality of radio base stations, RBSs, each RBS providing one or more cells, e.g., as illustrated in FIG. 1.

FIG. 6a also illustrates an example computer program product 65 comprising a non-transitory computer readable medium, having thereon a computer program comprising instructions. The computer program product comprises a computer readable medium such as, for example a universal serial bus (USB) memory, a plug-in card, an embedded drive or a read only memory (ROM). The computer readable medium has stored thereon a computer program comprising program instructions. The computer program is loadable into a processing circuitry 61, which may, for example, be comprised in a host computer of a radio base station, e.g., a radio base station providing a default cell. When loaded into the processing circuitry 61, the computer program may be stored in a memory 61*b* associated with or comprised in the processing circuitry. According to some embodiments, the computer program may, when loaded into and run by the processing circuitry, cause execution of the above described method steps.

Thus, the computer program is loadable into data processing circuitry, e.g., into the processing circuitry 61 of FIG. 6*a*, and is configured to assist call setup recovery in a wireless network. Thus, the example arrangement of FIG. 6*a* may, for example, be configured to perform method steps described in connection with FIG. 3.

The arrangement comprises processing circuitry 61 configured to cause receiving, in association with call setup with a wireless device, of a call setup failure report from the wireless device, wherein the call setup failure report comprises information on a set number of consecutive call setup failures determined by the wireless device during call setup attempts to an RBS providing a first cell. The processing circuitry is further configured to cause obtaining of a report forwarding request and forwarding, responsive to the report forwarding request, of the call setup failure report to the OSS, wherein the forwarding is performed in compliance with a latency constraint for call setup recovery.

According to aspects of the disclosure, the processing circuitry comprises a processor 61*a* and a memory 61*b*. The processor 61*a* may be any suitable type of computation unit or circuit, e.g. a microprocessor, digital signal processor, DSP, field programmable gate array, FPGA, or application specific integrated circuit, ASIC or any other form of circuitry. It should be appreciated that the processing circuitry need not be provided as a single unit, but may be provided as any number of units or circuitry. According to aspects of the disclosure, the arrangement may be implemented in a host computer of a radio base station, e.g., a radio base station providing a default cell. The memory may be any suitable type of computer readable memory capable of storing instructions of a computer program and may be of volatile and/or non-volatile type.

Figure 6B:
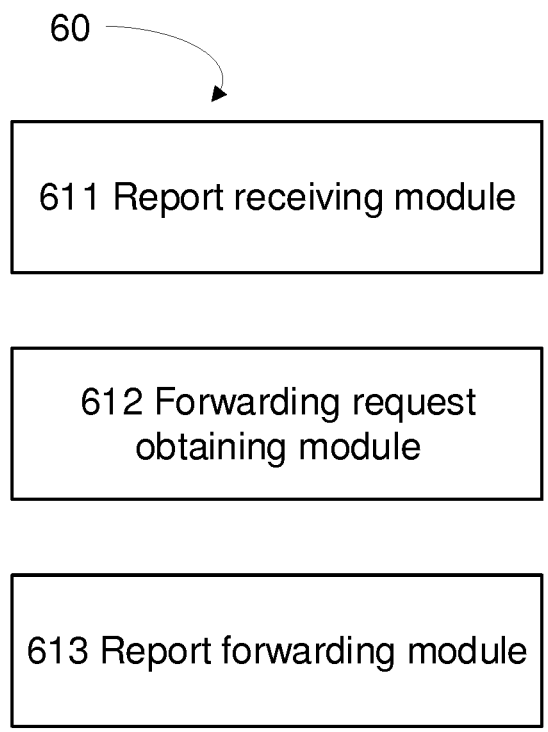
FIG. 6b is a schematic block diagram illustrating an example arrangement according to some embodiments.

FIG. 6*b* provides another schematic block diagram illustration of the arrangement. The arrangement comprises call setup report receiving module 611 configured to cause receiving, in association with call setup with a wireless device, of a call setup failure report from the wireless device, wherein the call setup failure report comprises information on a set number of consecutive call setup failures determined by the wireless device during call setup attempts to an RBS providing a first cell. The arrangement further comprises a report forwarding request obtaining module 612 configured to obtain, e.g., from the wireless device, a request to forward the call setup failure report. Additionally, the arrangement comprises a report forwarding module, configured to cause forwarding of the call setup failure report to the OSS, wherein the forwarding is performed in compliance with a latency constraint for call setup recovery.

The example arrangement of FIG. 6*b* may, for example, be configured to perform method steps described in connection with FIG. 3.

Figure 7A:
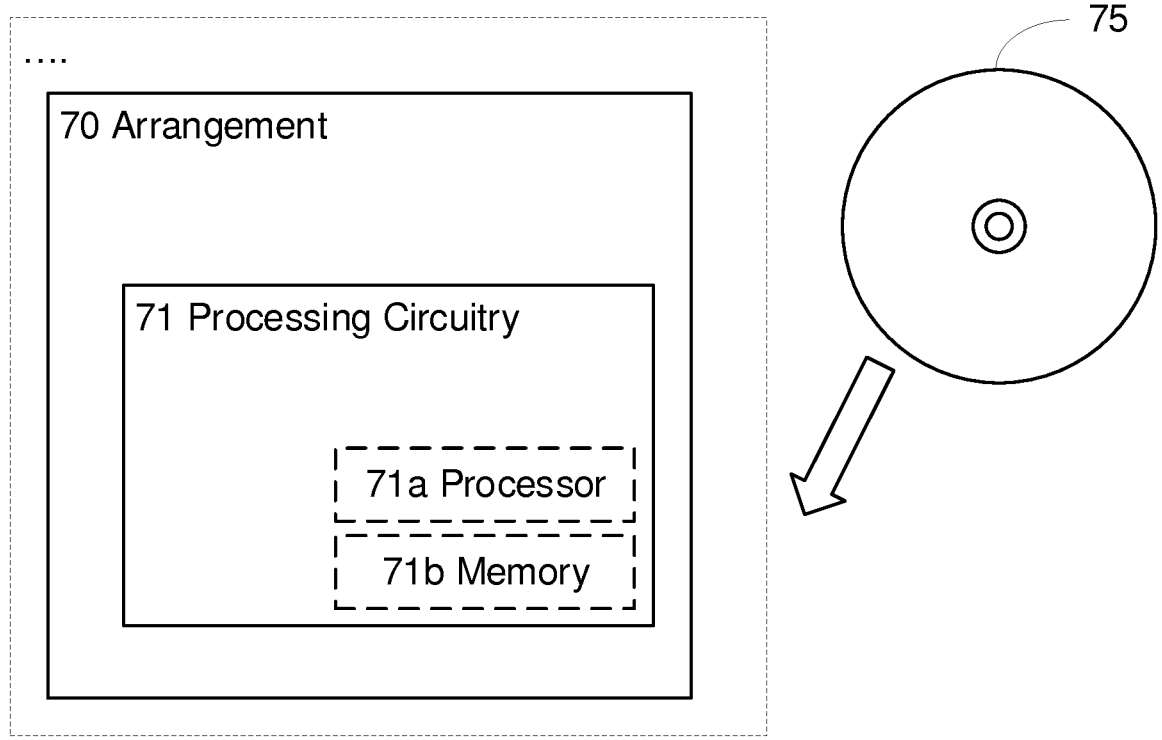
FIG. 7a is a schematic drawing of a block diagram illustrating an example arrangement and a computer readable medium according to some embodiments.

FIG. 7*a* is a schematic block diagram illustrating an example arrangement 60 for assisting call setup recovery in a wireless network, the wireless network comprising an operation support system, OSS, and a plurality of radio base stations, RBSs, each RBS providing one or more cells, e.g., as illustrated in FIG. 1.

FIG. 7*a* also illustrates an example computer program product 75 comprising a non-transitory computer readable medium, having thereon a computer program comprising instructions. The computer program product comprises a computer readable medium such as, for example a universal serial bus (USB) memory, a plug-in card, an embedded drive or a read only memory (ROM). The computer readable medium has stored thereon a computer program comprising program instructions. The computer program is loadable into a processing circuitry 71, which may, for example, be comprised in a host computer of an operation support system, OSS. When loaded into the processing circuitry 71, the computer program may be stored in a memory 71*b* associated with or comprised in the processing circuitry. According to some embodiments, the computer program may, when loaded into and run by the processing circuitry, cause execution of the above described method steps.

Thus, the computer program is loadable into data processing circuitry, e.g., into the processing circuitry 71 of FIG. 7*a*, and is configured to assist call setup recovery in a wireless network. Thus, the example arrangement of FIG. 7*a* may, for example, be configured to perform method steps described in connection with FIG. 4.

The arrangement comprises processing circuitry 71 configured to cause receiving of a call setup failure report from an RBS providing a default cell, wherein the call setup failure report comprises information on a set number of consecutive call setup failures determined by a wireless device during preceding call setup attempts to an RBS providing a first cell. The processing circuitry is further configured to cause determining of a call setup recovery activity for call setup in the first cell and initiating of the call setup recovery activity in at least the radio base station of the first cell, wherein the initiating is performed in compliance with a latency constraint for call setup recovery.

According to aspects of the disclosure, the processing circuitry comprises a processor 71*a* and a memory 71*b*. The processor 71*a* may be any suitable type of computation unit or circuit, e.g. a microprocessor, digital signal processor, DSP, field programmable gate array, FPGA, or application specific integrated circuit, ASIC or any other form of circuitry. It should be appreciated that the processing circuitry need not be provided as a single unit, but may be provided as any number of units or circuitry. According to aspects of the disclosure, the arrangement may be implemented in a host computer of a radio base station, e.g., a radio base station providing a default cell. The memory may be any suitable type of computer readable memory capable of storing instructions of a computer program and may be of volatile and/or non-volatile type.

Figure 7B:
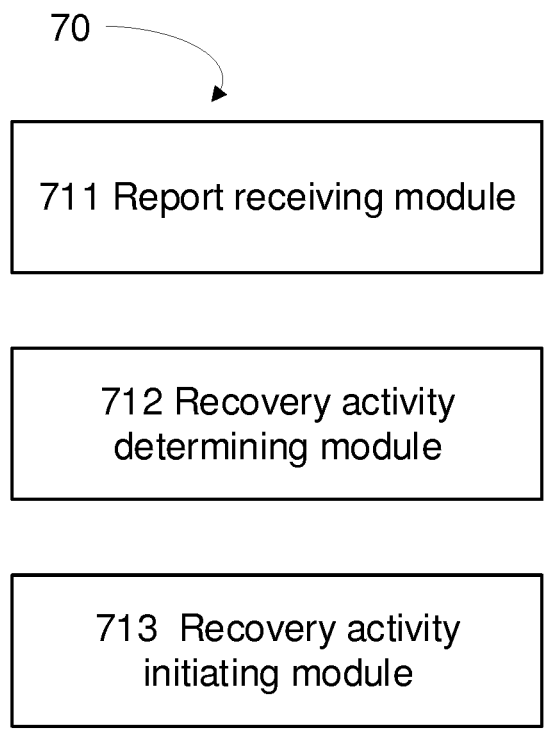
FIG. 7b is a schematic block diagram illustrating an example arrangement according to some embodiments.

FIG. 7*b* provides another schematic block diagram illustration of the arrangement. The arrangement comprises call setup report receiving module 711 configured to cause receiving of a call setup failure report from an RBS providing a default cell, wherein the call setup failure report comprises information on a set number of consecutive call setup failures determined by a wireless device during preceding call setup attempts to an RBS providing a first cell. The arrangement further comprises a recovery activity determining module 712 configured to determine a call setup recovery activity for call setup in the first cell. Additionally, the arrangement comprises a call setup recovery initiating module configured to initiate the call setup recovery activity in at least the radio base station of the first cell, wherein the initiating is performed in compliance with a latency constraint for call setup recovery.

The example arrangement of FIG. 7*b* may, for example, be configured to perform method steps described in connection with FIG. 4.

The above proposed methods and arrangements, provide the benefits that every call setup issue experienced by any wireless device in a cell, e.g., a first cell, will be reported in real time to the OSS so that an action may be initiated within latency constraints defined for call setup recovery. Such latency constraints may be determined based on latency requirements for devices served in the network and type of communication to be performed by these wireless devices.

Additionally, with information whether the call setup failure issue occurs at cell level or only at some particular locations within a cell, different recovery methods may be used that are customized to the specific failure issue. The recovery methods have the objective to solve the issue as soon as possible and this leads to a better subscriber appreciation. If the call setup failure issue occurs on some locations within a cell, that cell is declared as problematic and a recovery index is broadcasted to all wireless devices within the cell.

With this recovery index at hand, cell recovery may be initiated more promptly than in the basic procedure. Rather than waiting for the set number of consecutive call setup failures to occur before reselecting a neighboring cell, it only performs the number defined by the recovery index, e.g., one call setup attempt, before reselecting that neighbor cell. This leads to a faster call setup an improved subscribed experience.

With the above proposed methods and arrangements, information may also be provided to wireless devices camping in neighboring cells. With such feature, a wireless device moving towards a problematic cell will be aware in advance of the problem and will be able to take necessary actions to minimize the effect of the problem.

For sensitive calls (e.g. emergency call), an emergency index lower than the set number of consecutive call setup failures used to initiate the ordinary cell reselection procedure may be used at all occasions. As a result, the reselection of a default cell for a sensitive call will be quicker than in the prior art solutions.

Figure 8:
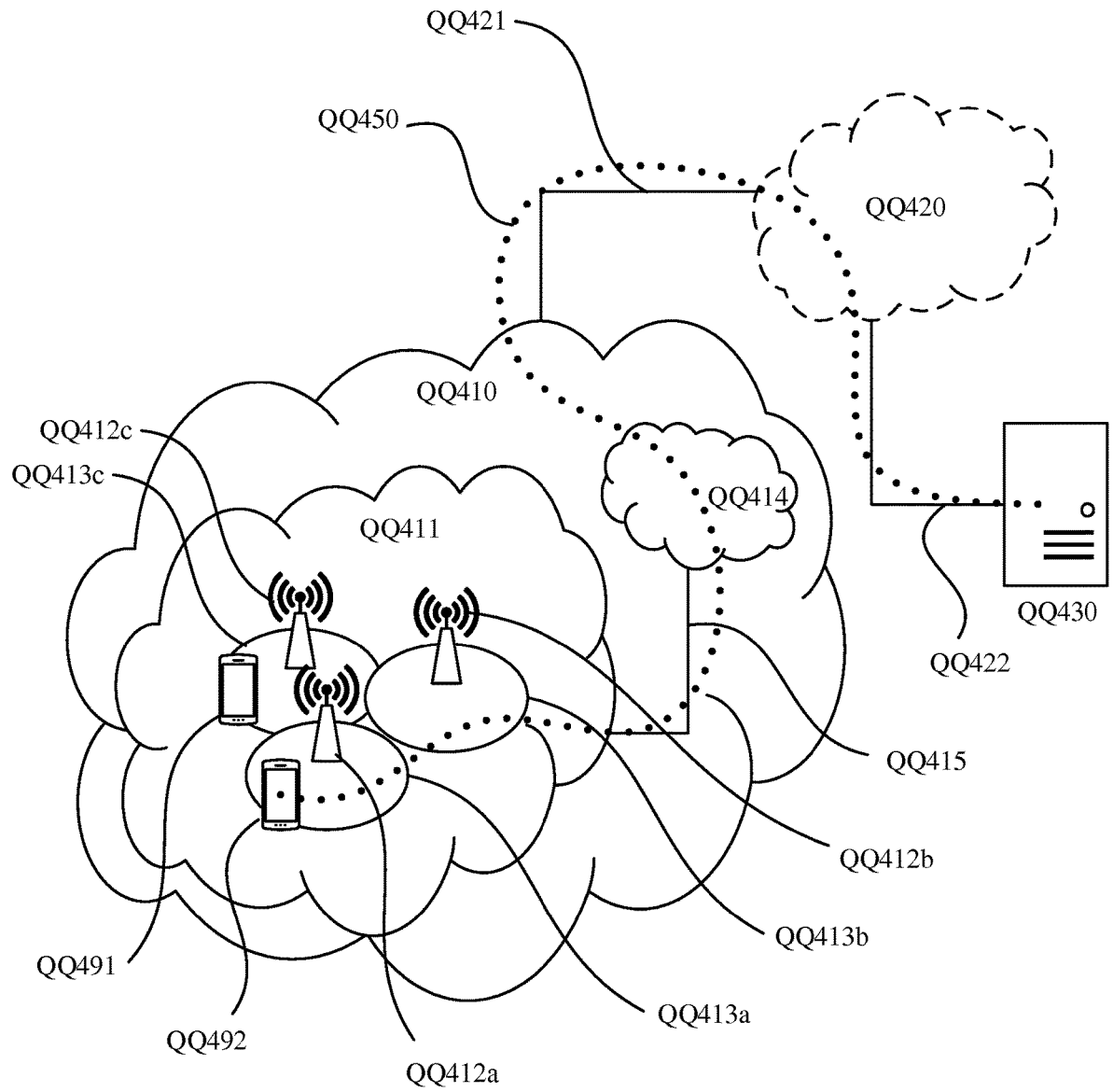
FIG. 8 is a flowchart illustrating example method steps implemented in a communication system including a host computer, a base station and a user equipment in accordance with some embodiments.

With reference to FIG. 8, in accordance with an embodiment, a communication system includes telecommunication network QQ410, such as a 3GPP-type cellular network, which comprises access network QQ411, such as a radio access network, and core network QQ414. Access network QQ411 comprises a plurality of radio base stations, RBSs, QQ412a, QQ412b, QQ412c, such as NBs, eNBs, gNBs or other types of wireless access points, each defining a corresponding coverage area QQ413a, QQ413b, QQ413c. Each RBS QQ412a, QQ412b, QQ412c is connectable to core network QQ414 over a wired or wireless connection QQ415. A first wireless device QQ491 located in coverage area QQ413c is configured to wirelessly connect to, or be paged by, the corresponding RBS QQ412c. A second wireless device QQ492 in coverage area QQ413a is wirelessly connectable to the corresponding RBS QQ412a. While a plurality of wireless devices QQ491, QQ492 are illustrated in this example, the disclosed embodiments are equally applicable to a situation where a sole wireless device is in the coverage area or where a sole wireless device is connecting to the corresponding RBS QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. As will be understood, the host computer may host functions of an operations and support system, OSS. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 8 as a whole enables connectivity between the connected wireless devices QQ491, QQ492 and host computer QQ430. The connectivity may be described as an over-the-top (OTT) connection QQ450. Host computer QQ430 and the connected wireless devices QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, RBS QQ412 may not or need not be informed about the past routing of an incoming downlink communication with data originating from host computer QQ430 to be forwarded (e.g., handed over) to a connected wireless device QQ491. Similarly, RBS QQ412 need not be aware of the future routing of an outgoing uplink communication originating from the wireless device QQ491 towards the host computer QQ430.

Example implementations, in accordance with an embodiment, of the wireless device, RBS and host computer discussed in the preceding paragraphs will now be described with reference to FIG. 9. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as wireless device QQ530 connecting via OTT connection QQ550 terminating at wireless device QQ530 and host computer QQ510. In providing the service to the remote user, host application QQ512 may provide user data which is transmitted using OTT connection QQ550.

Communication system QQ500 further includes RBS QQ520 provided in a telecommunication system and comprising hardware QQ525 enabling it to communicate with host computer QQ510 and with wireless device QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with wireless device QQ530 located in a coverage area (not shown in FIG. 7) served by RBS QQ520. Communication interface QQ526 may be configured to facilitate connection QQ560 to host computer QQ510. Connection QQ560 may be direct or it may pass through a core network (not shown in FIG. 9) of the telecommunication system and/or through one or more intermediate networks outside the telecommunication system. In the embodiment shown, hardware QQ525 of RBS QQ520 further includes processing circuitry QQ528, which may comprise one or more programmable processors, application-specific integrated circuits, field programmable gate arrays or combinations of these (not shown) adapted to execute instructions. RBS QQ520 further has software QQ521 stored internally or accessible via an external connection.

Communication system QQ500 further includes wireless device QQ530 already referred to. Its hardware QQ535 may include radio interface QQ537 configured to set up and maintain wireless connection QQ570 with a RBS serving a coverage area in which wireless device QQ530 is currently located. Hardware QQ535 of wireless device QQ530 further includes processing circuitry QQ538, which may comprise one or more programmable processors, application-specific integrated circuits, field programmable gate arrays or combinations of these (not shown) adapted to execute instructions. Wireless device QQ530 further comprises software QQ531, which is stored in or accessible by wireless device QQ530 and executable by processing circuitry QQ538. Software QQ531 includes client application QQ532. Client application QQ532 may be operable to provide a service to a human or non-human user via wireless device QQ530, with the support of host computer QQ510. In host computer QQ510, an executing host application QQ512 may communicate with the executing client application QQ532 via OTT connection QQ550 terminating at wireless device QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

Figure 9:
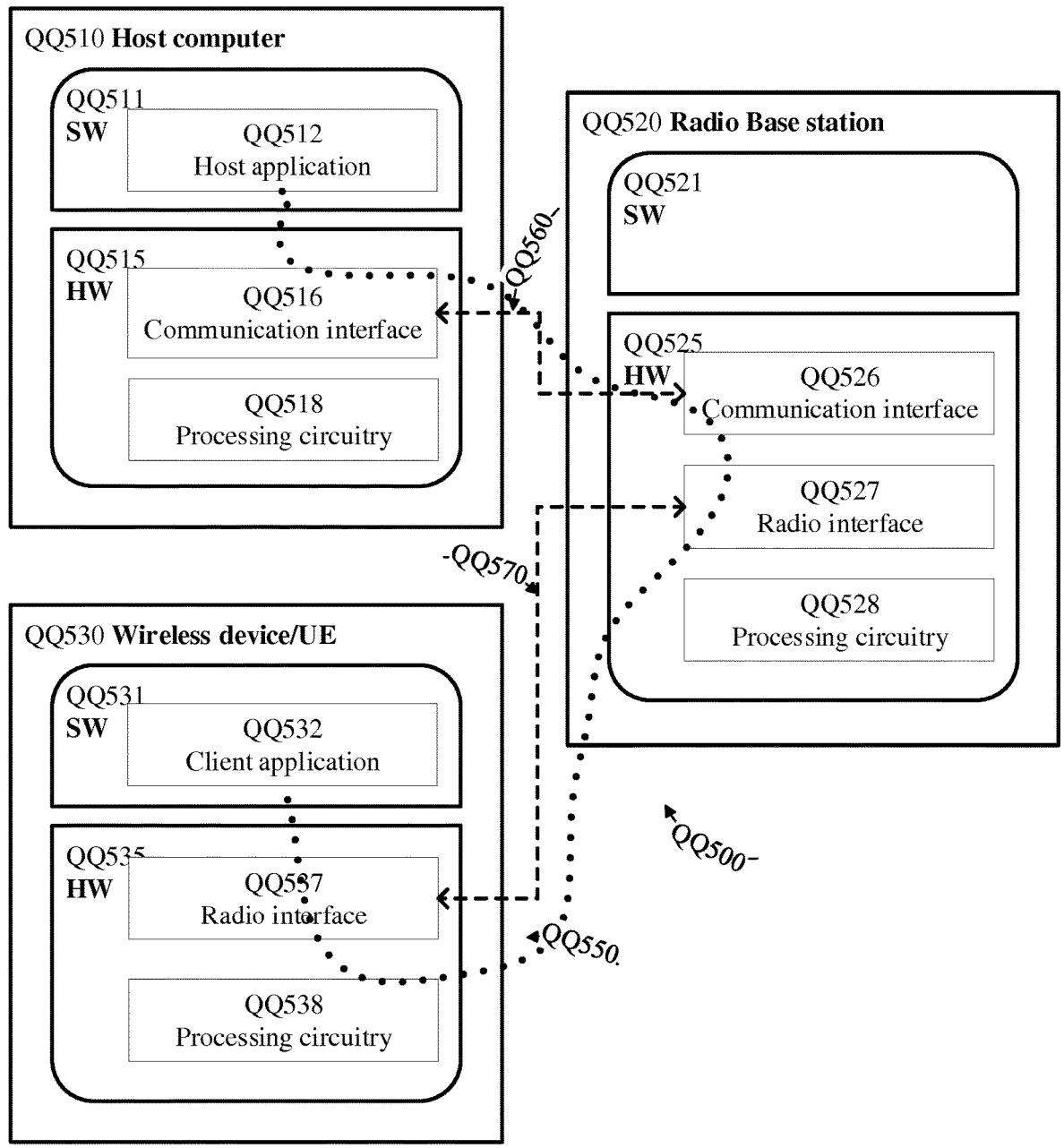
FIG. 9 is a flowchart illustrating example method steps implemented in a communication system including a host computer, a base station and a user equipment in accordance with some embodiments.

It is noted that host computer QQ510, RBS QQ520 and wireless device QQ530 illustrated in FIG. 9 may be similar or identical to host computer QQ430, one of RBSs QQ412a, QQ412b, QQ412c and one of wireless device s QQ491, QQ492 of FIG. 8, respectively. This is to say, the inner workings of these entities may be as shown in FIG. 9 and independently, the surrounding network topology may be that of FIG. 8.

In FIG. 9, OTT connection QQ550 has been drawn abstractly to illustrate the communication between host computer QQ510 and wireless device QQ530 via RBS QQ520, without explicit reference to any intermediary devices and the precise routing of messages via these devices. Network infrastructure may determine the routing, which it may be configured to hide from wireless device QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between wireless device QQ530 and RBS QQ520 is in accordance with the teachings of the embodiments described throughout this disclosure. One or more of the various embodiments improve the performance of OTT services provided to wireless device QQ530 using OTT connection QQ550, in which wireless connection QQ570 forms the last segment. More precisely, the teachings of these embodiments may improve the utilization of the channel capacity and thereby provide benefits such as improved system performance, reduced risk of cell trapping or cell recovery latency, i.e., improved call setup recovery.

A measurement procedure may be provided for the purpose of monitoring data rate, latency and other factors on which the one or more embodiments improve. There may further be an optional network functionality for reconfiguring OTT connection QQ550 between host computer QQ510 and wireless device QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of wireless device QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect RBS QQ520, and it may be unknown or imperceptible to RBS QQ520. Such procedures and functionalities may be known and practiced in the art. In certain embodiments, measurements may involve proprietary wireless device signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 10A:
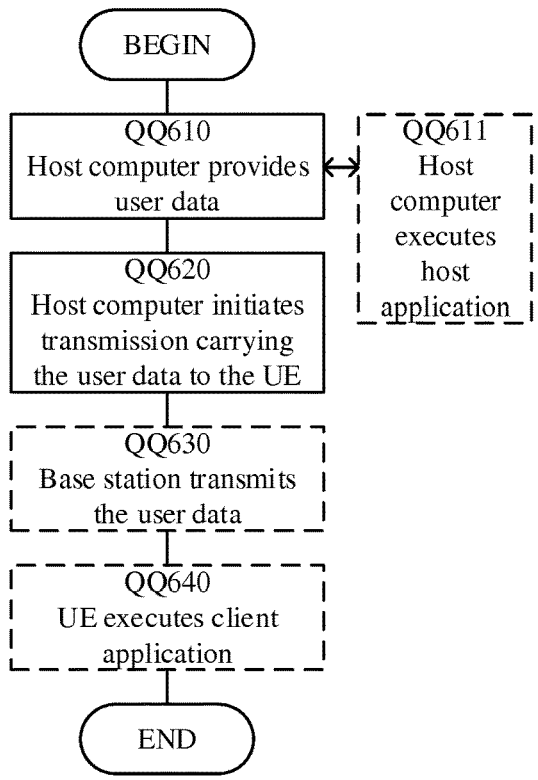
FIGS. 10*a*, 10*b*, 10*c*, and 10*d* are flowcharts illustrating example method steps implemented in a communication system including a host computer, a base station and a user equipment in accordance with some embodiments.

FIG. 10a is a flowchart illustrating a method implemented in a communication system, in accordance with one embodiment. The communication system includes a host computer, an RBS and a wireless device/UE, which may be those described with reference to FIGS. 8 and 9. For simplicity of the present disclosure, only drawing references to FIG. 10a will be included in this section. In step QQ610, the host computer provides user data. In substep QQ611 (which may be optional) of step QQ610, the host computer provides the user data by executing a host application. In step QQ620, the host computer initiates a transmission carrying the user data to the wireless device. In step QQ630 (which may be optional), the RBS transmits to the wireless device/UE the user data which was carried in the transmission that the host computer initiated, in accordance with the teachings of the embodiments described throughout this disclosure. In step QQ640 (which may also be optional), the wireless device/UE executes a client application associated with the host application executed by the host computer.

Figure 10B:
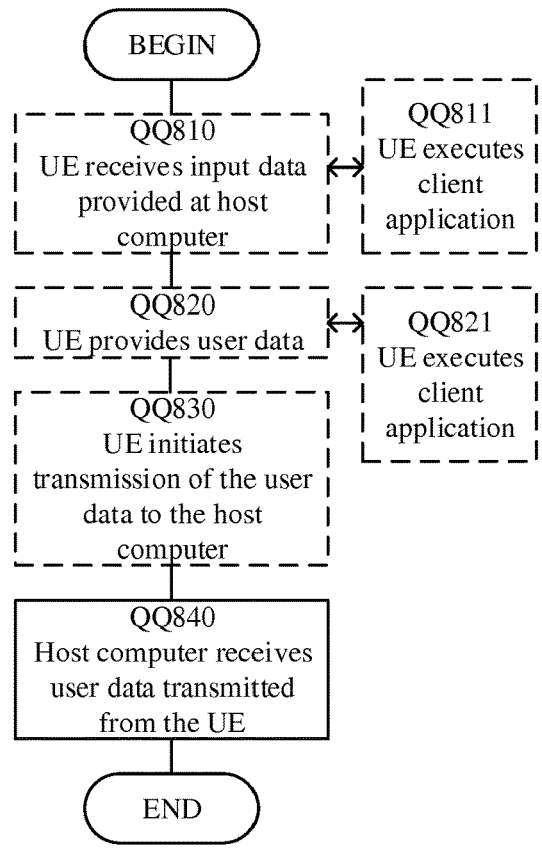

FIG. 10b is a flowchart illustrating a method implemented in a communication system, in accordance with one embodiment. The communication system includes a host computer, a RBS and a wireless device/UE which may be those described with reference to FIGS. 8 and 9. For simplicity of the present disclosure, only drawing references to FIG. 10b will be included in this section. In step QQ710 of the method, the host computer provides user data. In an optional substep (not shown) the host computer provides the user data by executing a host application. In step QQ720, the host computer initiates a transmission carrying the user data to the wireless device. The transmission may pass via the RBS, in accordance with the teachings of the embodiments described throughout this disclosure. In step QQ730 (which may be optional), the wireless device receives the user data carried in the transmission.

Figure 10C:
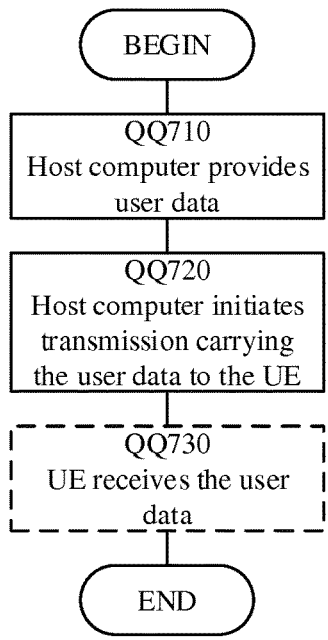

FIG. 10c is a flowchart illustrating a method implemented in a communication system, in accordance with one embodiment. The communication system includes a host computer, a RBS and a wireless device/UE which may be those described with reference to FIGS. 6 and 7. For simplicity of the present disclosure, only drawing references to FIG. 10 will be included in this section. In step QQ810 (which may be optional), the wireless device receives input data provided by the host computer. Additionally or alternatively, in step QQ820, the wireless device provides user data. In substep QQ821 (which may be optional) of step QQ820, the wireless device/UE provides the user data by executing a client application. In substep QQ811 (which may be optional) of step QQ810, the wireless device executes a client application which provides the user data in reaction to the received input data provided by the host computer. In providing the user data, the executed client application may further consider user input received from the user. Regardless of the specific manner in which the user data was provided, the wireless device/UE initiates, in substep QQ830 (which may be optional), transmission of the user data to the host computer. In step QQ840 of the method, the host computer receives the user data transmitted from the wireless device, in accordance with the teachings of the embodiments described throughout this disclosure.

Figure 10D:
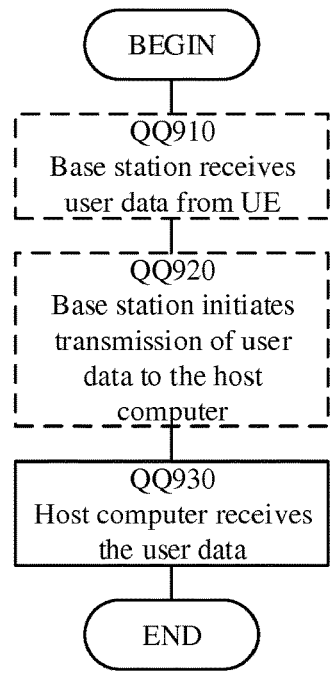

FIG. 10d is a flowchart illustrating a method implemented in a communication system, in accordance with one embodiment. The communication system includes a host computer, a RBS and a wireless device/UE which may be those described with reference to FIGS. 8 and 9. For simplicity of the present disclosure, only drawing references to FIG. 10d will be included in this section. In step QQ910 (which may be optional), in accordance with the teachings of the embodiments described throughout this disclosure, the RBS receives user data from the wireless device. In step QQ920 (which may be optional), the RBS initiates transmission of the received user data to the host computer.

In step QQ930 (which may be optional), the host computer receives the user data carried in the transmission initiated by the RBS.

Generally, all terms used herein are to be interpreted according to their ordinary meaning in the relevant technical field, unless a different meaning is clearly given and/or is implied from the context in which it is used.

Reference has been made herein to various embodiments. However, a person skilled in the art would recognize numerous variations to the described embodiments that would still fall within the scope of the claims.

For example, the method embodiments described herein discloses example methods through steps being performed in a certain order. However, it is recognized that these sequences of events may take place in another order without departing from the scope of the claims. Furthermore, some method steps may be performed in parallel even though they have been described as being performed in sequence. Thus, the steps of any methods disclosed herein do not have to be performed in the exact order disclosed, unless a step is explicitly described as following or preceding another step and/or where it is implicit that a step must follow or precede another step.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Any feature of any of the embodiments disclosed herein may be applied to any other embodiment, wherever suitable. Likewise, any advantage of any of the embodiments may apply to any other embodiments, and vice versa.

Hence, it should be understood that the details of the described embodiments are merely examples brought forward for illustrative purposes, and that all variations that fall within the scope of the claims are intended to be embraced therein.

EXAMPLE EMBODIMENTS

Group A Embodiments

A1. A method performed by a wireless device for assisting call setup recovery, the method comprising:
registering (S21) a set number of consecutive call setup failures to an RBS providing a first cell;
initiating (S22) a cell reselection procedure to a RBS providing a default cell
providing (S23), at call setup in the default cell, a call setup failure report to the RBS providing the default cell, wherein the call set up failure report comprises information on the call setup failures to the RBS providing the first cell; and
causing (S24) forwarding of the call setup failure report from the RBS providing the default cell to the OSS, wherein the forwarding of the call setup failure report is caused in compliance with a latency constraint for call setup recovery.

A2. The method of any of the previous embodiments in Group A, further comprising:
providing user data; and
forwarding the user data to a host computer via the transmission to the RBS.

Group B Embodiments

B1. A method performed by a radio base station, RBS, for assisting call setup recovery, the method comprising, the method comprising:
receiving (S31), in association with call setup with a wireless device, a call setup failure report from the wireless device, wherein the call setup failure report comprises information on a set number of consecutive call setup failures determined by the wireless device during call setup attempts to an RBS providing a first cell;
obtaining (S32) a report forwarding request; and
forwarding (S34), responsive to the report forwarding request, the call setup failure report to the OSS, wherein the forwarding is performed in compliance with a latency constraint for call setup recovery.

B2. The method of any of the previous embodiments in Group B, further comprising:
obtaining user data; and
forwarding the user data to a host computer or a wireless device.

Group C Embodiments

C1. A wireless device for assisting call setup recovery, the wireless device comprising:
processing circuitry configured to perform any of the steps of any of the Group A embodiments; and
power supply circuitry configured to supply power to the wireless device.

C2. A radio base station, RBS, for assisting call setup recovery, the RBS comprising:
processing circuitry configured to perform any of the steps of any of the Group B embodiments;
power supply circuitry configured to supply power to the RBS.

C3. A wireless device for assisting call setup recovery, the wireless device comprising:
an antenna configured to send and receive wireless signals;
radio front-end circuitry connected to the antenna and to processing circuitry, and configured to condition signals communicated between the antenna and the processing circuitry;
the processing circuitry being configured to perform any of the steps of any of the Group A embodiments;
an input interface connected to the processing circuitry and configured to allow input of information into the wireless device to be processed by the processing circuitry;
an output interface connected to the processing circuitry and configured to output information from the wireless device that has been processed by the processing circuitry; and
a battery connected to the processing circuitry and configured to supply power to the wireless device.

Group D Embodiments

D1. A communication system including a host computer comprising:
processing circuitry configured to provide user data; and
a communication interface configured to forward the user data to a cellular network for transmission to a user equipment wireless device,
wherein the cellular network comprises a radio base station, RBS, having a radio interface and processing circuitry, the RBS's processing circuitry configured to perform any of the steps described for the Group B embodiments.

D2. The communication system of embodiment D1 further including the RBS.

D3. The communication system of any of embodiments D1 through D2, further including the wireless device, wherein the wireless device is configured to communicate with the RBS.

D4. The communication system of any of embodiments D1 through D3, wherein:
the processing circuitry of the host computer is configured to execute a host application, thereby providing the user data; and
the wireless device comprises processing circuitry configured to execute a client application associated with the host application.

D5. A method implemented in a communication system including a host computer, a RBS and a wireless device, the method comprising:
at the host computer, providing user data; and
at the host computer, initiating a transmission carrying the user data to the wireless device via a cellular network comprising the RBS, wherein the RBS performs any of the steps described for the Group B embodiments.

D6. The method of embodiment D5, further comprising, at the RBS, transmitting the user data.

D7. The method of any of embodiments D5 through D6, wherein the user data is provided at the host computer by executing a host application, the method further comprising, at the wireless device, executing a client application associated with the host application.

D8. A wireless device configured to communicate with a RBS, the wireless device comprising a radio interface and processing circuitry configured to perform the method of any of embodiments D5 through D7.

D9. A communication system including a host computer comprising:
processing circuitry configured to provide user data; and
a communication interface configured to forward user data to a cellular network for transmission to a wireless device,
wherein the wireless device comprises a radio interface and processing circuitry, the wireless devices components configured to perform any of the steps described for the Group A embodiments.

D10. The communication system of embodiment D9, wherein the cellular network further includes a RBS configured to communicate with the wireless device.

D11. The communication system of any of embodiments D9 through D10, wherein:
the processing circuitry of the host computer is configured to execute a host application, thereby providing the user data; and
the wireless device's processing circuitry is configured to execute a client application associated with the host application.

D12. A method implemented in a communication system including a host computer, a RBS and a wireless device, the method comprising:
at the host computer, providing user data; and
at the host computer, initiating a transmission carrying the user data to the wireless device via a cellular network comprising the RBS, wherein the wireless device performs any of the steps described for the Group A embodiments.

D13. The method of embodiment D12, further comprising at the wireless device, receiving the user data from the RBS.

D14. A communication system including a host computer comprising:
communication interface configured to receive user data originating from a transmission from a wireless device to a RBS,
wherein the UE comprises a radio interface and processing circuitry, the wireless device's processing circuitry configured to perform any of the steps described for the Group A embodiments.

D15. The communication system of embodiment D14, further including the wireless device.

D16. The communication system of any of embodiments D14 through D15, further including the RBS, wherein the RBS comprises a radio interface configured to communicate with the UE and a communication interface configured to forward to the host computer the user data carried by a transmission from the UE to the RBS.

D17. The communication system of any of embodiments D14 through D16, wherein:

the processing circuitry of the host computer is configured to execute a host application; and the wireless device's processing circuitry is configured to execute a client application associated with the host application, thereby providing the user data.

D18. The communication system of any of embodiments D14 through D17, wherein:

the processing circuitry of the host computer is configured to execute a host application, thereby providing request data; and the wireless device's processing circuitry is configured to execute a client application associated with the host application, thereby providing the user data in response to the request data.

D19. A method implemented in a communication system including a host computer, a RBS and a user equipment (UE), the method comprising:

at the host computer, receiving user data transmitted to the RBS from the wireless device, wherein the wireless device performs any of the steps described for the Group A embodiments.

D20. The method of embodiment D19, further comprising, at the wireless device, providing the user data to the RBS.

D21. The method of any of embodiments D19 through D20, further comprising:

at the wireless device, executing a client application, thereby providing the user data to be transmitted; and at the host computer, executing a host application associated with the client application.

D22. The method of any of embodiments D19 through D21, further comprising:

at the wireless device, executing a client application; and at the wireless device, receiving input data to the client application, the input data being provided at the host computer by executing a host application associated with the client application, wherein the user data to be transmitted is provided by the client application in response to the input data.

D23. A wireless device configured to communicate with a RBS, the UE comprising a radio interface and processing circuitry configured to perform the method of any of embodiments D19 through D22.

D24. A communication system including a host computer comprising a communication interface configured to receive user data originating from a transmission from a user equipment (UE) to a RBS, wherein the RBS comprises a radio interface and processing circuitry, the RBS's processing circuitry configured to perform any of the steps described for the Group B embodiments.

D25. The communication system of embodiment D24 further including the RBS.

D26. The communication system of any of embodiments D24 through D25, further including the UE, wherein the UE is configured to communicate with the RBS.

D27. The communication system of any of embodiments D24 through D25, wherein:

the processing circuitry of the host computer is configured to execute a host application;

the wireless device is configured to execute a client application associated with the host application, thereby providing the user data to be received by the host computer.

D28. A method implemented in a communication system including a host computer, a RBS and a user equipment (UE), the method comprising:

at the host computer, receiving, from the RBS, user data originating from a transmission which the RBS has received from the UE, wherein the UE performs any of the steps described for the Group A embodiments.

D29. The method of embodiment D28, further comprising at the RBS, receiving the user data from the wireless device.

D30. The method of any of embodiments D28 through D29, further comprising at the RBS, initiating a transmission of the received user data to the host computer.

D31. A method implemented in a communication system including a host computer, a RBS and a wireless device, the method comprising:

at the host computer, receiving, from the RBS, user data originating from a transmission which the RBS has received from the wireless device, wherein the RBS performs any of the steps described for the Group B embodiments.

D32. The method of embodiment D31, further comprising at the RBS, receiving the user data from the wireless device.

D33. The method of any of embodiments D31 through D32, further comprising at the RBS, initiating a transmission of the received user data to the host computer.

The invention claimed is:

1. A method of a wireless device for assisting call setup recovery in a wireless network, the wireless network comprising an operation support system (OSS) and a plurality of radio base stations (RBSs) that collectively provide a plurality of cells, wherein each of the RBSs provides one or more cells of the plurality of cells, and wherein the plurality of RBSs comprises an RBS providing a first cell of the plurality of cells and an RBS providing a default cell of the plurality of cells, the method comprising:

registering a set number of consecutive call setup failures to the RBS providing the first cell of the plurality of cells;

initiating a cell reselection procedure to the RBS providing the default cell of the plurality of cells;

providing, at call setup in the default cell, a call setup failure report to the RBS providing the default cell, wherein the call set up failure report comprises information on the call setup failures to the RBS providing the first cell; and causing forwarding of the call setup failure report from the RBS providing the default cell to the OSS, wherein the forwarding of the call setup failure report is caused in compliance with a latency constraint for the call setup recovery.

2. The method of claim 1, wherein the first and default cells are neighboring cells.

3. The method of claim 1, wherein the RBS providing the first cell is a first RBS and the RBS providing the default cell is a default RBS different from the first RBS.

4. The method of claim 1, further comprising:

associating location information for the wireless device to respective one or more call setup failures of the set number of consecutive call setup failures.

5. The method of claim 4, wherein the location information comprises an identifier of the first cell.

6. The method of claim 5, wherein the location information comprises information relating to a geographical position when registering call setup failures of the wireless device in the first cell.

7. The method of claim 1, further comprising:

receiving information regarding a call set up recovery activity from the RBS providing the default cell.

8. The method of claim 7, wherein the call setup recovery activity comprises barring of the first cell until expiry of a timer set by an operator or until an action triggered on the first cell indicate a successful call recovery.

9. The method of claim 7, wherein the received information comprises a recovery index M that is a number lower than the set number of consecutive call setup failures.

10. The method of claim 1, wherein the call setup failure report comprises information relating to beam measurements performed by the wireless device.

11. A non-transitory computer readable medium, having thereon a computer program comprising instructions, the computer program being loadable into processing circuitry and configured to cause performance of a method when the computer program is run by the processing circuitry of a wireless device, wherein the method is for assisting call setup recovery in a wireless network, the wireless network comprising an operation support system (OSS) and a plurality of radio base stations (RBSs) that collectively provide a plurality of cells, wherein each the RBSs provides one or more cells of the plurality of cells, and wherein the plurality of RBSs comprises an RBS providing a first cell of the plurality of cells and an RBS providing a default cell of the plurality of cells, the method comprising:
registering a set number of consecutive call setup failures to the RBS providing the first cell of the plurality of cells;
initiating a cell reselection procedure to the RBS providing the default cell of the plurality of cells;
providing, at call setup in the default cell, a call setup failure report to the RBS providing the default cell, wherein the call set up failure report comprises information on the call setup failures from the RBS providing the first cell; and
causing forwarding of the call setup failure report from the RBS providing the default cell to the OSS, wherein the forwarding of the call setup failure report is caused in compliance with a latency constraint for the call setup recovery.

12. An arrangement for assisting call setup recovery in a wireless network, the wireless network comprising an operation support system (OSS) and a plurality of radio base stations (RBSs) that collectively provide a plurality of cells, wherein each of the RBSs provides one or more cells of the plurality of cells, and wherein the plurality of RBSs comprises an RBS providing a first cell of the plurality of cells and an RBS providing a default cell of the plurality of cells, the arrangement comprising processing circuitry configured to cause:
registering of a set number of consecutive call setup failures to the RBS providing the first cell of the plurality of cells;
initiating of a cell reselection procedure to the RBS providing the default cell of the plurality of cells;
providing, at call setup in the default cell, of a call setup failure report to the RBS providing the default cell, wherein the call set up failure report comprises information on the call setup failures from the RBS providing the first cell; and
causing of a forwarding of the call setup failure report from the RBS providing the default cell to the OSS, wherein the forwarding of the call setup failure report is caused in compliance with a latency constraint for the call setup recovery.

13. A method of a radio base station (RBS) providing a default cell, for assisting call setup recovery in a wireless network, the wireless network comprising an operation support system (OSS) and a plurality of radio base stations (RBSs) that collectively provide a plurality of cells, wherein each of the RBSs provides one or more cells of the plurality of cells, and wherein the plurality of RBSs comprises an RBS providing a first cell of the plurality of cells and the RBS providing the default cell of the plurality of cells, the method comprising:
receiving, in association with call setup with a wireless device, a call setup failure report from the wireless device, wherein the call setup failure report comprises information on a set number of consecutive call setup failures determined by the wireless device during call setup attempts to the RBS providing the first cell of the plurality of cells;
obtaining a report forwarding request; and
forwarding, responsive to the report forwarding request, the call setup failure report from the RBS providing the default cell to the OSS, wherein the forwarding is performed in compliance with a latency constraint for the call setup recovery.

14. The method of claim 13, wherein the first and default cells are neighboring cells.

15. The method of claim 13, wherein the RBS providing the first cell is a first RBS and the RBS providing the default cell is a default RBS different from the first RBS.

16. The method of claim 13, further comprising:
associating location information for the wireless device to one or more call setup failures of the set number of consecutive call setup failures.

17. The method of claim 16, wherein the location information is obtained by estimating a location of the wireless device when detecting a call setup attempt from the wireless device.

18. The method of claim 13, further comprising:
obtaining information on a call-set up recovery activity from the OSS; and
performing the call setup recovery activity, wherein the call-setup recovery activity is performed in compliance with a latency constraint for the call setup recovery.

19. The method of claim 18, wherein the performing of the call setup recovery activity comprises signaling information on the call-set up recovery activity to at least the RBS providing the first cell.

20. The method of claim 19, wherein the call setup recovery activity comprises barring of the first cell until expiry of a timer set by an operator or until an action triggered on the first cell indicate a successful call recovery.

21. The method of claim 18, wherein the information obtained from the OSS comprises a recovery index M that is a number lower than the set number of consecutive call setup failures.

22. The method of claim 21, wherein the performing of the call set-up recovery activity comprises:
transmitting information on the recovery index M that is the number lower than the set number of consecutive call setup failures to at least one wireless device.

23. The method of claim 13, further comprising:
providing call setup failure information to respective RBSs of one or more neighboring cells in response to receiving the call setup failure report.

24. A non-transitory computer readable medium, having thereon a computer program comprising instructions, the computer program being loadable into processing circuitry and configured to cause performance of a method when the computer program is run by the processing circuitry of a radio base station (RBS) providing a default cell, wherein the method is for assisting call setup recovery in a wireless network, the wireless network comprising an operation support system (OSS) and a plurality of radio base stations (RBSs) that collectively provide a plurality of cells, wherein each of the plurality of RBSs provide one or more cells of the plurality of cells, and wherein the plurality of RBSs comprises an RBS providing a first cell of the plurality of cells and the RBS providing the default cell of the plurality of cells, the method comprising:
- receiving, in association with call setup with a wireless device, a call setup failure report from the wireless device, wherein the call setup failure report comprises information on a set number of consecutive call setup failures determined by the wireless device during call setup attempts to the RBS providing the first cell of the plurality of cells;
- obtaining a report forwarding request; and
- forwarding, responsive to the report forwarding request, the call setup failure report from the RBS providing the default cell to the OSS, wherein the forwarding is performed in compliance with a latency constraint for the call setup recovery.

25. An arrangement for assisting call setup recovery in a wireless network, the wireless network comprising an operation support system (OSS) and a plurality of radio base stations (RBSs) that collectively provide a plurality of cells, wherein each of the RBSs provides one or more cells of the plurality of cells, and wherein the plurality of RBSs comprises an RBS providing a first cell of the plurality of cells and an RBS providing a default cell of the plurality of cells, the arrangement comprising processing circuitry configured to cause:
- receiving, in association with call setup with a wireless device, a call setup failure report from the wireless device, wherein the call setup failure report comprises information on a set number of consecutive call setup failures determined by the wireless device during call setup attempts to an the RBS providing the first cell of the plurality of cells;
- obtaining a report forwarding request; and
- forwarding, responsive to the report forwarding request, the call setup failure report from the RBS providing the default cell to the OSS, wherein the forwarding is performed in compliance with a latency constraint for the call setup recovery.

26. A method of an operation support system (OSS) for assisting call setup recovery in a wireless network, the wireless network comprising the OSS and a plurality of radio base stations (RBSs) that collectively provide a plurality of cells, wherein each of the RBSs provides one or more cells of the plurality of cells, and wherein the plurality of RBSs comprises an RBS providing a first cell of the plurality of cells and an RBS providing a default cell of the plurality of cells, the method comprising:
- receiving at least one call setup failure report from the RBS providing the default cell of the plurality of cells, wherein the call setup failure report comprises information on a set number of consecutive call setup failures determined by a wireless device during preceding call setup attempts to Drill the RBS providing the first cell of the plurality of cells;
- determining a call setup recovery activity for call setup in the first cell of the plurality of cells; and
- initiating the call setup recovery activity in at least the radio base station of the first cell of the plurality of cells, wherein the initiating is performed in compliance with a latency constraint for the call setup recovery.

27. The method of claim 26, wherein the call setup recovery activity comprises barring of the first cell until expiry of a timer set by an operator or until an action triggered on the first cell indicate a successful call recovery.

28. The method of claim 26, wherein the call setup failure report comprises location information for the wireless device, wherein the location information is associated to respective one or more call setup failures.

29. The method of claim 26, wherein the location information comprises an identifier for the default cell and/or information relating to a geographical position at the call setup failure of the wireless device in the first cell.

30. The method of claim 26, further comprising providing call setup failure information to respective ones of the RBSs that provide one or more respective neighboring cells of the default cell of the plurality of cells in response to receiving the call setup failure report.

31. A non-transitory computer readable medium, having thereon a computer program comprising instructions, the computer program being loadable into processing circuitry and configured to cause performance of a method when the computer program is run by the processing circuitry of an operation support system (OSS), wherein the method is for assisting call setup recovery in a wireless network, the wireless network comprising the OSS and a plurality of radio base stations (RBSs) that collectively provide a plurality of cells, wherein each of the RBSs provides one or more cells of the plurality of cells, and wherein the plurality of RBSs comprises an RBS providing a first cell of the plurality of cells and an RBS providing a default cell of the plurality of cells, the method comprising:
- receiving at least one call setup failure report from the RBS providing the default cell, wherein the call setup failure report comprises information on a set number of consecutive call setup failures determined by a wireless device during preceding call setup attempts to the RBS providing the first cell;
- determining a call setup recovery activity for call setup in the first cell; and
- initiating the call setup recovery activity in at least the radio base station of the first cell, wherein the initiating is performed in compliance with a latency constraint for the call setup recovery.

32. An arrangement for assisting call setup recovery in a wireless network, the wireless network comprising an operation and support system (OSS), and a plurality of radio base stations (RBSs) that collectively provide a plurality of cells, wherein each of the RBSs provides one or more cells of the plurality of cells, and wherein the plurality of RBSs comprises an RBS providing a first cell of the plurality of cells and an RBS providing a default cell of the plurality of cells, the arrangement comprising processing circuitry configured to cause:
- receiving of a call setup failure report from the RBS providing the default cell of the plurality of cells, wherein the call setup failure report comprises information on a set number of consecutive call setup failures determined by a wireless device during preceding call setup attempts to the RBS providing the first cell of the plurality of cells;
- determining of a call setup recovery activity for call setup in the first cell of the plurality of cells; and
- initiating of the call setup recovery activity in at least the radio base station of the first cell of the plurality of cells, wherein the initiating is performed in compliance with a latency constraint for the call setup recovery.

* * * * *